(12) United States Patent  (10) Patent No.: US 7,047,366 B1
Ezra  (45) Date of Patent: May 16, 2006

(54) QOS FEATURE KNOBS

(75) Inventor: Josef Ezra, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 372 days.

(21) Appl. No.: 10/463,247

(22) Filed: Jun. 17, 2003

(51) Int. Cl.
G06F 12/00 (2006.01)

(52) U.S. Cl. ............ 711/141; 711/129; 711/135
(58) Field of Classification Search ............ 711/129, 711/135, 133, 134, 136, 141, 111, 112
See application file for complete search history.

(56) References Cited

U.S. PATENT DOCUMENTS

| 5,206,939 | A | 4/1993 | Yanai et al. |
| 5,381,539 | A | 1/1995 | Yanai et al. |
| 5,537,568 | A | 7/1996 | Yanai et al. |
| 5,592,432 | A | 1/1997 | Vishlitzky et al. |
| 5,778,394 | A | 7/1998 | Galtzur et al. |
| 5,845,147 | A | 12/1998 | Vishlitzky et al. |
| 5,857,208 | A | 1/1999 | Ofek |
| 6,035,375 | A | 3/2000 | Yanai et al. |
| 6,412,045 | B1 * | 6/2002 | DeKoning et al. .......... 711/135 |
| 6,487,562 | B1 | 11/2002 | Mason, Jr. et al. |
| 6,529,998 | B1 | 3/2003 | Yochai et al. |
| 6,546,467 | B1 * | 4/2003 | Farrall et al. ............... 711/146 |

OTHER PUBLICATIONS

U.S. Appl. No. 09/535,134, filed Mar. 24, 2000, titled Segmenting Cache to Provide Varying Service Levels by Daniel Lambright, et al.

* cited by examiner

Primary Examiner—Brian R. Peugh
(74) Attorney, Agent, or Firm—Muirhead and Saturnelli, LLC

(57) ABSTRACT

Described are various quality of service (QOS) parameters that may be used in characterizing device behavior in connection with a cache. A Partition parameter indicates which portions of available cache may be used with data of an associated device. A Survival parameter indicates how long data of an associate device should remain in cache after use. A Linearity parameter indicates a likelihood factor that subsequent data tracks may be used such that this parameter may be used in determining whether to prefetch data. A Flush parameter indicates how long data should remain in cache after a write pending slot is returned to cache after being written out to the actual device. The QOS parameters may be included in configuration data. The QOS parameter values may be read and/or modified.

46 Claims, 31 Drawing Sheets

| Device | Device configuration information | |
|--------|-------------------|---|
| | QOS parameters 856 | ... |
| D1 | ... | ... |
| D2 | ... | ... ... |
| ... ... | ... ... .. | ... ... .. |
| Dn | ... | ... |

FIGURE 21

| QOS Survival parameter value | 0 | 1..E | F |
|---|---|---|---|
| cache slot TBC | 0 or old time stamp | current time stamp − (FTT/2) | current time stamp |
| cache slot Queue | LRU | MRU and second chance = 0/OFF | MRU and second chance = 1/ON |
| | min | | max |

FIGURE 24

QOS FEATURE KNOBS

BACKGROUND

1. Technical Field

This application generally relates to a computer system, and more particularly to data storage system parameters.

2. Description of Related Art

Computer systems may include different resources used by one or more host processors. Resources and host processors in a computer system may be interconnected by one or more communication connections. These resources may include, for example, data storage devices such as the Symmetrix™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may nor correspond to the actual disk drives. Allowing multiple host systems to access the single storage device unit allows the host systems to share data stored therein.

Performance of a storage system may be improved by using a cache. In the case of a disk drive system, the cache may be implemented using a block of semiconductor memory that has a relatively lower data access time than the disk drive. Data that is accessed is advantageously moved from the disk drives or other device to the cache so that the second and subsequent accesses to the data may be made to the cache rather than to the disk drives. Data that has not been accessed recently may be removed from the cache to make room for new data. Often such cache accesses are transparent to the host system requesting the data.

One technique for implementing a cache is to store the data in blocks and link each of the blocks together in a doubly linked ring list referred to herein as a replacement queue. Each block of the replacement queue represents a block of data from a logical disk unit. The blocks or slots are placed in the doubly linked ring list in the order in which they are retrieved from the disk. A pointer may point to the block that was most recently added to the list. Thus, when a new block is to be added to the cache within the replacement queue, the structure of the replacement queue, in combination with the head pointer, may be used to determine the oldest block in the replacement queue that is to be removed to make room for the new block. An implementation of the replacement queue may use both a "head" pointer and a "tail" pointer identifying, respectively, the beginning and end of the replacement queue. The "tail" may determine the oldest block or slot in the replacement queue. Two such pointers may be used in an replacement queue arrangement as it may be desirable in accordance with cache management schemes in which some data may remain permanently in the cache and the "oldest" and "newest" data may not be adjacent to one another.

Cache management techniques are described, for example, in issued U.S. Pat. No. 5,381,539, Jan. 10, 1995, entitled "System and Method for Dynamically Controlling Cache Management", Yanai et al., assigned to EMC Corporation of Hopkinton, Mass., which is herein incorporated by reference, in which a data storage system has a cache controlled by parameters including: (a) a minimum number of data storage elements which must be retrieved and stored in cache memory and used by the system before the cache management system recognizes a sequential data access in progress; (b) the maximum number of tracks or data records which the cache management system is to prefetch ahead; and (c) the maximum number of sequential data elements to be stored in cache before the memory containing the previously used tracks or data records are reused or recycled and new data written to these locations. The cache memory is in a least-recently used circular configuration in which the cache management system overwrites or recycles the oldest or least recently used memory location. The cache manager provides monitoring and dynamic adjustment of the foregoing parameters.

Described in issued U.S. Pat. No. 5,592,432, Jan. 7, 1997, entitled "Cache Management System Using Time Stamping for Replacement Queue", Vishlitzky et al., which is herein incorporated by reference, is a system that includes a cache directory listing data elements in a cache memory and a cache manager memory including a replacement queue and data structures. A cache manager determines which data element should be removed or replaced in the cache memory based on the elapsed time the data element has been in the memory. If the elapsed time is less than a predetermined threshold, the data element will be maintained in the same location in the replacement queue saving a number of cache management operations. The predetermined threshold is established as the average fall through time (FTT) of prior data elements in the memory. A modified least-recently-used replacement procedure uses time stamps indicating real or relative time when a non-write-pending data element was promoted to the tail of the replacement queue, the most-recently used position. Also disclosed is another embodiment in which the number of times the data element is accessed while in the memory is compared to a fixed number. If the data element has been accessed more than the fixed number, it is placed at the tail of the replacement queue ensuring a longer period for the data element in the memory.

Described in U.S. Pat. No. 5,206,939, Apr. 27, 1993, entitled "System and Method for Disk Mapping and Retrieval", Yanai et al, which is herein incorporated by reference, is a device-by-device cache index/directory used in disk mapping and data retrieval.

Different techniques may be used to manage the cache. In particular, different approaches may be used in determining the amount of time a portion of data remains in the cache, such as the least recently used (LRU) approach.

Data may be stored in a cache in order to increase efficiency. Although data storage systems may provide sophisticated storage management in connection with cache management and other functionality, it may be desirable to provide controls related to the quality of service (QOS) for the data storage system. QOS parameters are described, for example, in U.S. Pat. No. 6,487,562, entitled DYNAMICALLY MODIFYING SYSTEM PARAMETERS IN A DATA STORAGE SYSTEM, Nov. 26, 2002, to Mason, Jr. et al., assigned to EMC Corporation, of Hopkinton, Mass., which is incorporated herein by reference. A QOS parameter may be associated with cache behavior. It may be desirable to identify certain volumes as having a higher priority than others. It may be desirable to provide one or more QOS parameters in connection with designating a device caching priority. Additionally, it may be desirable that these QOS parameters be dynamic and modifiable during normal operation.

SUMMARY OF THE INVENTION

In accordance with one aspect of the invention is a method for determining cache behavior associated with a logical volume including: associating at least one parameter affecting a caching characteristic associated with the logical volume; and selecting a value for the at least one parameter, wherein the at least one parameter includes one of: a partition parameter, a survival parameter, a linearity parameter, and a flush parameter. The partition parameter designates which portions of cache may be used by the logical volume. The survival parameter affects a time period that a portion of data associated with the logical volume remains in cache. The linearity parameter affects whether data prefetching is performed for the logical volume. The flush parameter affects a time period a portion of data associated with the logical volume remains in cache after destaging a write of the data to the logical volume. The value may be determined in accordance with at least one of: a predetermined logical volume priority, a characteristic of data stored on the logical volume, and a usage characteristic of the data stored on the logical volume. The value may be dynamically modified. The value may be determined in accordance with tuning performance of the logical volume in a data storage system. The value may be a first value, and the method may also include: obtaining a first value for the at least one parameter from a portion of global memory; copying the first value to another portion of memory local to a first processor controlling data operations to the logical volume; updating the first value to a second value in the portion of global memory; notifying a plurality of processors including the first processor of the updating; copying said second value to said other portion of memory local to said first processor; and using the second value by the first processor and using the first value by another processor since updating local copies of the value associated with each of the plurality of processors is performed without synchronization. A mode setting may also be examined to determine whether to use the value in connection with performing caching and a data operation associated with the logical volume. The at least one parameter may include the partition parameter, and the value may be one of a predetermined number of bit patterns indicating one of: which portions of a cache may be used by the logical volume, and which caches of a plurality of caches may be used by the logical volume, and the method may also include: receiving by the logical volume a request for a data operation; and using at least one parameter may include the survival parameter, and the method may include: receiving by the logical volume a request for a data operation; determining whether data associated with the data operation is in cache; and using the value to determine a new cache position for the data affecting how long the data remains in the cache. The cache may use time stamps in connection with determining said new cache position and the method may also include: determining a time stamp value associated with the new cache position in accordance with the value. The at least one parameter may include the linearity parameter, and the method may also include: receiving by the logical volume a request for a data operation; and determining, using the value, whether prefetching is to be performed for the data operation. An amount of data to be prefetched may be determined using the value if the prefetching is to be performed. The at least one parameter may include the flush parameter, and the method may further include: writing data included in a cache slot out to the logical volume; and using the value to determine a new cache position for the data included in the cache slot wherein the new cache position affects how long the data remains in cache. The logical volume may be defined as one of: a physical device, a portion of a physical device, portions of multiple physical devices, a physical device track, a logical device, a portion of a logical device, and portions of multiple logical devices.

In accordance with another aspect of the invention is a method for determining cache behavior associated with a logical volume including: associating at least one parameter with the logical volume; determining a performance characteristic of the logical volume; and selecting a value for the at least one parameter in accordance with the performance characteristic, wherein the at least one parameter includes at least one of: a partition parameter, a survival parameter, a linearity parameter, and a flush parameter. The partition parameter designates which portions of cache may be used by the logical volume. The survival parameter affects a time period that a portion of data associated with the logical volume remains in cache. The linearity parameter affects whether data prefetching is performed for the logical volume. The flush parameter affects a time period a portion of data associated with the logical volume remains in cache after destaging a write of the data to the logical volume. The logical volume may be one of a plurality of logical volumes included in a data storage system, and the performance characteristic may be a priority level associated with the logical volume in accordance with others of the plurality of logical volumes. The value included in a portion of global memory may be dynamically modified and the value may be copied to a local copy of parameter values for use by a processor used in connection with data operations to the logical volume. The processor may use a dynamically modifiable switch value to determine whether to use the value when performing a data operation and associated data caching. The value may be modified using one of: a user interface and an application programming interface. The value may be used to determine cache portions to be used in connection with obtaining cache slots for storing data of the logical volume in cache. The value may be used to determine a cache position of data associated with the logical device after a cache hit for the data has occurred, wherein the cache position affects how long the data remains in cache. The value may be used to determine whether prefetching is performed in connection with a data operation associated with the logical volume. The value may be used to determine an amount of data to prefetch for the data operation. The method may also include: writing data out to the logical volume; and using the value to determine a cache position to where the data is returned and the cache position affects how long the data remains in cache.

In accordance with another aspect of the invention is a computer program product for determining cache behavior associated with a logical volume including: machine executable code that associates at least one parameter affecting a caching characteristic associated with the logical volume; and machine executable code that selects a value for the at least one parameter, wherein the at least one parameter includes one of: a partition parameter, a survival parameter, a linearity parameter, and a flush parameter. The partition parameter designates which portions of cache may be used by the logical volume. The survival parameter affects a time period that a portion of data associated with the logical volume remains in cache. The linearity parameter affects whether data prefetching is performed for the logical volume. The flush parameter affects a time period a portion of data associated with the logical volume remains in cache after destaging a write of the data to the logical volume. The value may be determined in accordance with at least one of: a predetermined logical volume priority, a characteristic of data stored on the logical volume, and a usage characteristic of the data stored on the logical volume. The computer program product may also include: machine executable code that dynamically modifies the value. The value may be determined in accordance with tuning performance of the logical volume in a data storage system. The value may be a first value, and the computer program product may also include: machine executable code that obtains a first value for the at least one parameter from a portion of global memory; machine executable code that copies the first value to another portion of memory local to a first processor controlling data operations to the logical volume; machine executable code that updates the first value to a second value in the portion of global memory; machine executable code that notifies a plurality of processors including the first processor of the updating; machine executable code that copies the second value to the other portion of memory local to the first processor; and machine executable code that causes the second value to be used by the first processor and the first value to be used by another processor since updating local copies of the value associated with each of the plurality of processors is performed without synchronization. The computer program product may also include: machine executable code that examines a mode setting to determine whether to use the value in connection with performing caching and a data operation associated with the logical volume. The at least one parameter may include the partition parameter, and the value may be one of a predetermined number of bit patterns indicating one of: which portions of a cache may be used by the logical volume, and which caches of a plurality of caches may be used by the logical volume, and the computer program product may also include: machine executable code that receives, by the logical volume, a request for a data operation; and machine executable code that uses the value in determining a new cache slot to place data associated with the data operation. The at least one parameter may include the survival parameter, and the computer program product may include: machine executable code that receives by the logical volume a request for a data operation; machine executable code that determines whether data associated with the data operation is in cache; and machine executable code that uses the value to determine a new cache position for the data affecting how long the data remains in the cache. The cache may use time stamps in connection with determining the new cache position and the computer program product may also include: machine executable code that determines a time stamp value associated with the new cache position in accordance with the value. The at least one parameter may include the linearity parameter, and the computer program product may also include: machine executable code that receives by the logical volume a request for a data operation; and machine executable code that determines, using the value, whether prefetching is to be performed for the data operation. The computer program product may also include machine executable code that determines, using the value, an amount of data to be prefetched if the prefetching is to be performed. The at least one parameter may include the flush parameter, and the computer program product may also include: machine executable code that writes data included in a cache slot out to the logical volume; and machine executable code that uses the value to determine a new cache position for the data included in the cache slot wherein the new cache position affects how long the data remains in cache. The logical volume may be defined as one of: a physical device, a portion of a physical device, portions of multiple physical devices, a physical device track, a logical device, a portion of a logical device, and portions of multiple logical devices.

In accordance with another aspect of the invention is a computer program product for determining cache behavior associated with a logical volume including: machine executable code that associates at least one parameter with the logical volume; machine executable code that determines a performance characteristic of the logical volume; and machine executable code that selects a value for the at least one parameter in accordance with the performance characteristic. The at least one parameter includes at least one of: a partition parameter, a survival parameter, a linearity parameter, and a flush parameter. The partition parameter designates which portions of cache may be used by the logical volume. The survival parameter affects a time period that a portion of data associated with the logical volume remains in cache. The linearity parameter affects whether data prefetching is performed for the logical volume. The flush parameter affects a time period a portion of data associated with the logical volume remains in cache after destaging a write of the data to the logical volume. The logical volume may be one of a plurality of logical volumes included in a data storage system, and the performance characteristic may be a priority level associated with the logical volume in accordance with others of the plurality of logical volumes. The computer program product may also include: machine executable code that that dynamically modifies the value included in a portion of global memory; and machine executable code that copies the value to a local copy of parameter values for use by a processor used in connection with data operations to the logical volume. The processor may use a dynamically modifiable switch value to determine whether to use the value when performing a data operation and associated data caching. The computer program product may also include: machine executable code that modifies the value using one of: a user interface and an application programming interface. The computer program product may also include: machine executable code that uses the value to determine cache portions to be used in connection with obtaining cache slots for storing data of the logical volume in cache. The computer program product may also include machine executable code that uses the value to determine a cache position of data associated with said logical device after a cache hit for said data has occurred, wherein the cache position affects how long the data remains in cache. The computer program product may also include machine executable code that uses the value to determine whether prefetching is performed in connection with a data operation associated with the logical volume. The computer program product may also include: machine executable code that uses the value to determine an amount of data to prefetch for the data operation. The computer program product may also include: machine executable code that writes data out to the logical volume; and machine executable code that uses the value to determine a cache position to where the data is returned. The cache position affects how long the data remains in cache.

BRIEF DESCRIPTION OF THE DRAWINGS

Features and advantages of the present invention will become more apparent from the following detailed description of exemplary embodiments thereof taken in conjunction with the accompanying drawings in which:

FIG. 21 is an example of an embodiment of a device configuration table

FIG. 24 is a table illustrating the cache behavior in accordance with QOS Survival parameter values in one embodiment;

DETAILED DESCRIPTION OF EMBODIMENT(S)

Figure 1:
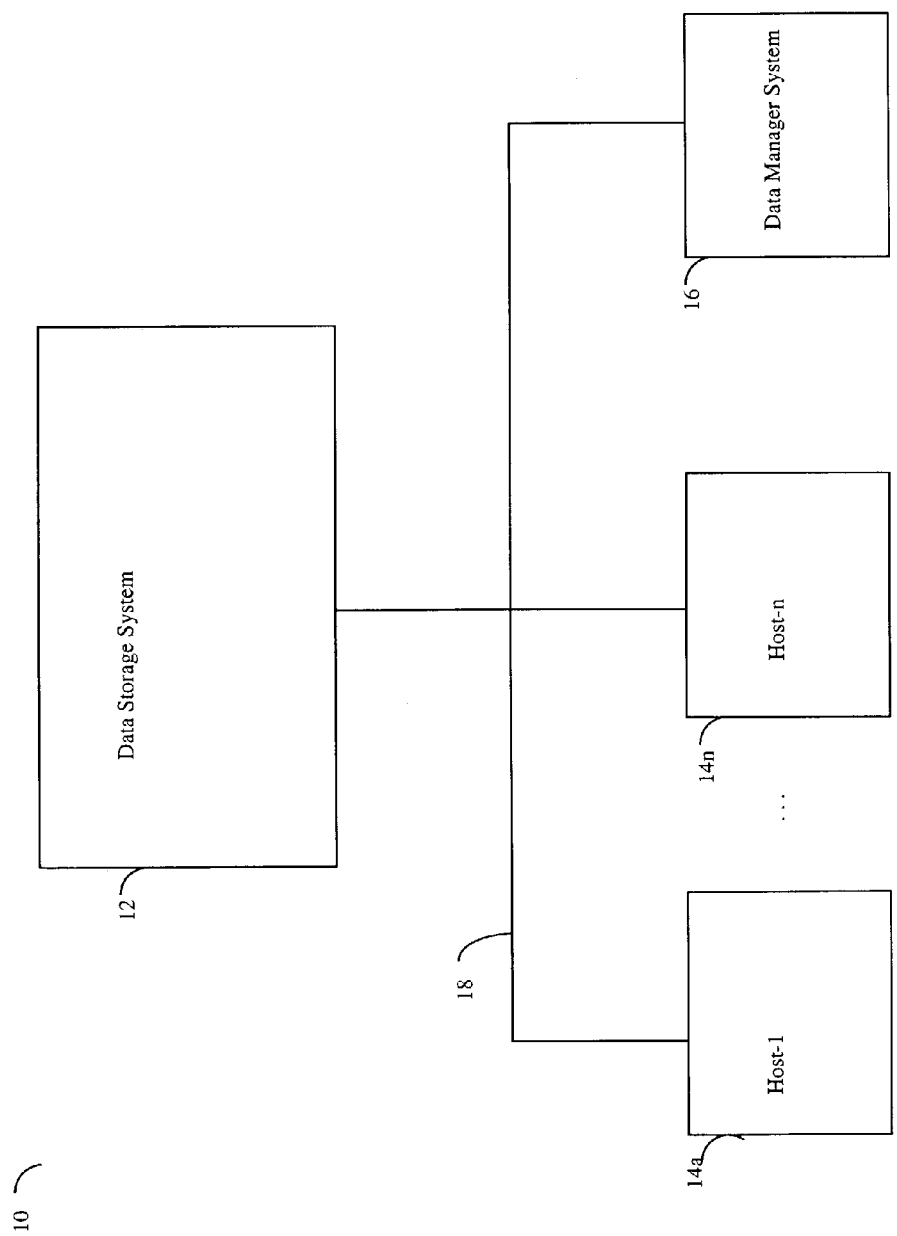
FIG. 1 is an example of an embodiment of a computer system according to the present invention.

Referring now to FIG. 1, shown is an example of an embodiment of a computer system according to the present invention. The computer system 10 includes a data storage system 12 connected to host systems 14a–14n, and a data manager system 16 through communication medium 18. In this embodiment of the computer system 10, the N hosts 14a–14n and the data manager system 16 may access the data storage system 12, for example, in performing input/output (I/O) operations or data requests. The communication medium 18 may be any one of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other connection(s) by which the host systems 14a–14n, and the data manager system may access and communicate with the data storage system 12, and may also communicate with others included in the computer system 10.

Each of the host systems 14a–14n, the data manager system 16, and the data storage system 12 included in the computer system 10 may be connected to the communication medium 18 by any one of a variety of connections as may be provided and supported in accordance with the type of communication medium 18. The processors included in the host computer systems 14a–14n and the data manager system 16 may be any one of a variety of commercially available single or multi-processor system, such as an Intel-based processor, IBM mainframe or other type of commercially available processor able to support incoming traffic in accordance with each particular embodiment and application.

It should be noted that the particulars of the hardware and software included in each of the host systems 14a–14n and the data manager system 16, as well as those components that may be included in the data storage system 12 are described herein in more detail, and may vary with each particular embodiment. Each of the host computers 14a–14n, as well as the data manager system 16, may all be located at the same physical site, or, alternatively, may also be located in different physical locations. Examples of the communication medium that may be used to provide the different types of connections between the host computer systems, the data manager system, and the data storage system of the computer system 10 may use a variety of different communication protocols such as SCSI, ESCON, Fibre Channel, or GIGE (Gigabit Ethernet), and the like. Some or all of the connections by which the hosts, data manager system 16 and data storage system 12 may be connected to the communication medium 18 may pass through other communication devices, such as a Connectrix or other switching equipment that may exist such as a phone line, a repeater, a multiplexer or even a satellite.

Each of the host computer systems as well as the data manager system may perform different types of data operations in accordance with different tasks. In the embodiment of FIG. 1, any one of the host computers 14*a*–14*n* may issue a data request to the data storage system 12 to perform a data operation.

Figure 2:
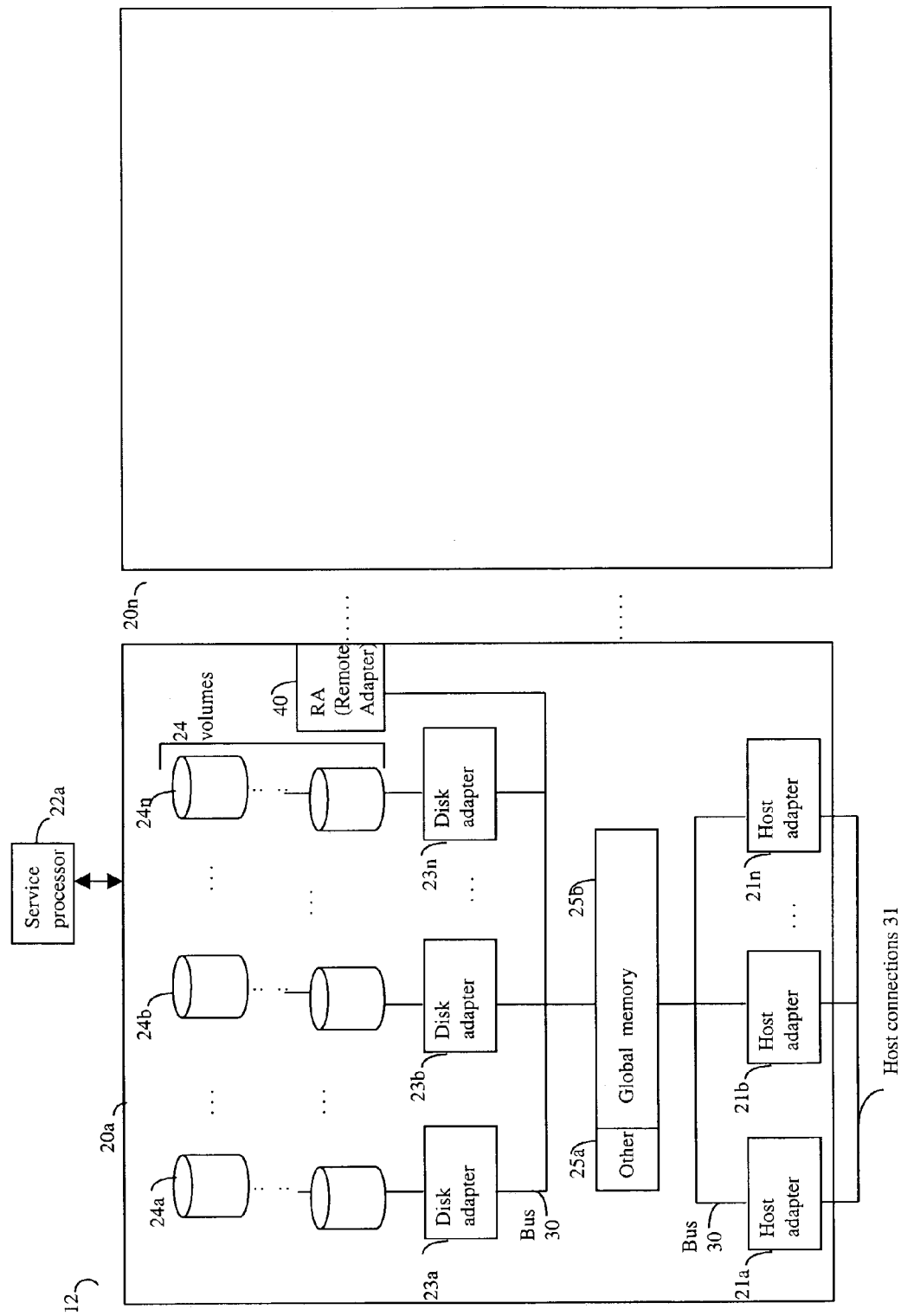
FIG. 2 is an example of an embodiment of a data storage system.

Referring now to FIG. 2, shown is an example of an embodiment of the data storage system 12 that may be included in the computer system 10 of FIG. 1. Included in the data storage system 12 of FIG. 2 are Symmetrix™ storage systems 20*a*–20*n* as manufactured by EMC Corporation of Hopkinton, Mass. In this particular example, each of the Symmetrix™ storage systems 20*a*–20*n* may be interconnected (not shown) as well as to the host and data manager systems through any one or more communication connections 30 that may vary with each particular embodiment and device in accordance with the different protocols used in a particular embodiment. Additionally, the type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20*a*. It should be noted that a similar more detailed description may also apply to any one or more of the other elements, such as 20*n*, but have been omitted for simplicity of explanation. It should also be noted that an embodiment may include other types of data storage systems in combination with one or more Symmetrix™ systems. Each of 20*a*–20*n* may be resources included in an embodiment of the computer system 10 to provide storage services to, for example, host computer systems and/or the data manager system.

Each of the Symmetrix™ systems, such as 20*a*, may include a plurality of disk devices or volumes, such as the arrangement 24 consisting of n rows of disks or volumes 24*a*–24*n*. In this arrangement, each row of disks or volumes may be connected to a disk adapter ("DA") or director responsible for the backend management of operations to and from a portion of the disks or volumes 24. In the Symmetrix™ system 20*a*, a single DA, such as 23*a*, may be responsible for the management of a row of disks or volumes, such as row 24*a*. Each of the DAs 23*a*–23*n* are connected, for example, by a bus 30 to a cache that includes a particular portion designated as global memory 25*b*. The DAs 23*a*–23*n* may perform data operations to and from the cache that may be included in the global memory 25*b*, for example, in communications with other disk processors or directors, and other components of the system 20*a*. Generally, the global memory 25*b* may be used in facilitating communications between components in the system 20*a*. The other portion 25*a* is that portion of memory that may be used in connection with other designations that may vary in accordance with each embodiment.

An embodiment of the Symmetrix™ system 20*a* may include a service processor 22*a* used to manage and monitor the system 20*a*. In one embodiment, the service processor 22*a* may be used to display and/or modify parameters in connection with the system 20*a*. An embodiment may also use the same service processor to display and/or modify parameters in connection with one or more other elements 20*b*–20*n*, such as other Symmetrix data storage systems. As described in more detail elsewhere herein, the service processor 22*a* may be used to display and/or modify system configuration information. The system configuration information may include Quality of Service (QOS) parameters for the data storage system 20. In one embodiment, the QOS parameters include one or more parameters related to caching characteristics that may be associated with a device. In the embodiment, the device may be a logical device, a physical device or a virtual device. The techniques described herein as relating to a device may also apply to other atomic units that may be defined in an embodiment. For example, another embodiment may define the atomic unit or granularity that may be associated with QOS parameters as a single device track.

The system configuration data may be gathered and stored, for example, in the global memory and/or other storage area. The system configuration data and QOS parameters are described elsewhere herein in more detail.

The system 20*a* may also include one or more host adapters ("HAs") or directors 21*a*–21*n*. Each of these HAs may be used to manage communications and data operations between one or more host systems and the global memory.

The particular data storage system as described in this embodiment, such as a Symmetrix™ system by EMC Corporation or a disk, should not be construed as a limitation. Other types of commercially available data storage systems, as well as processors and hardware controlling access to these particular devices, may be also be included in an embodiment.

Also shown in the storage system 20*a* is an RA or remote adapter 40. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a Symmetrix data storage system and a host system. The RAs may be used in facilitating communications between two Symmetrix data storage systems. The DAs may be used in connection with facilitating communications to the associated disk drive(s) and LV(s) residing thereon.

The DA may cause I/O operations to be performed on a volume or device. In the following description, data may be accessed by LV in which a single DA manages data requests in connection with I/O operations in connection with multiple LVs that may reside on a disk. The DA may accomplish this by creating job records for the different LVs associated with the particular DA. These different job records may be associated with the different LVs in a data structure stored and managed by each DA.

As described above, an embodiment may include a cache in the global memory portion 25*b* of FIG. 2. An embodiment may include a single or multiple replacement queue arrangement in the cache. An example of an embodiment that includes a cache using multiple replacement queues is described in pending U.S. patent application Ser. No. 09/535,134, entitled "Segmenting Cache to Provide Varying Service Levels", filed Mar. 24, 2000, and assigned to EMC Corporation of Hopkinton, Mass. An example of a system with a single cache memory is described in issued U.S. Pat. No. 5,381,539, Yanai et al., entitled "System and Method for Dynamically Controlling Cache Management", and also assigned to EMC Corporation of Hopkinton, Mass.

It should be noted that in an embodiment including a multiple replacement queue arrangement, there may be separate policies, decisions and data collections for one or more of the replacement queues in accordance with restrictions as to what devices use which of the replacement queues. This may vary with each embodiment.

Figure 3:
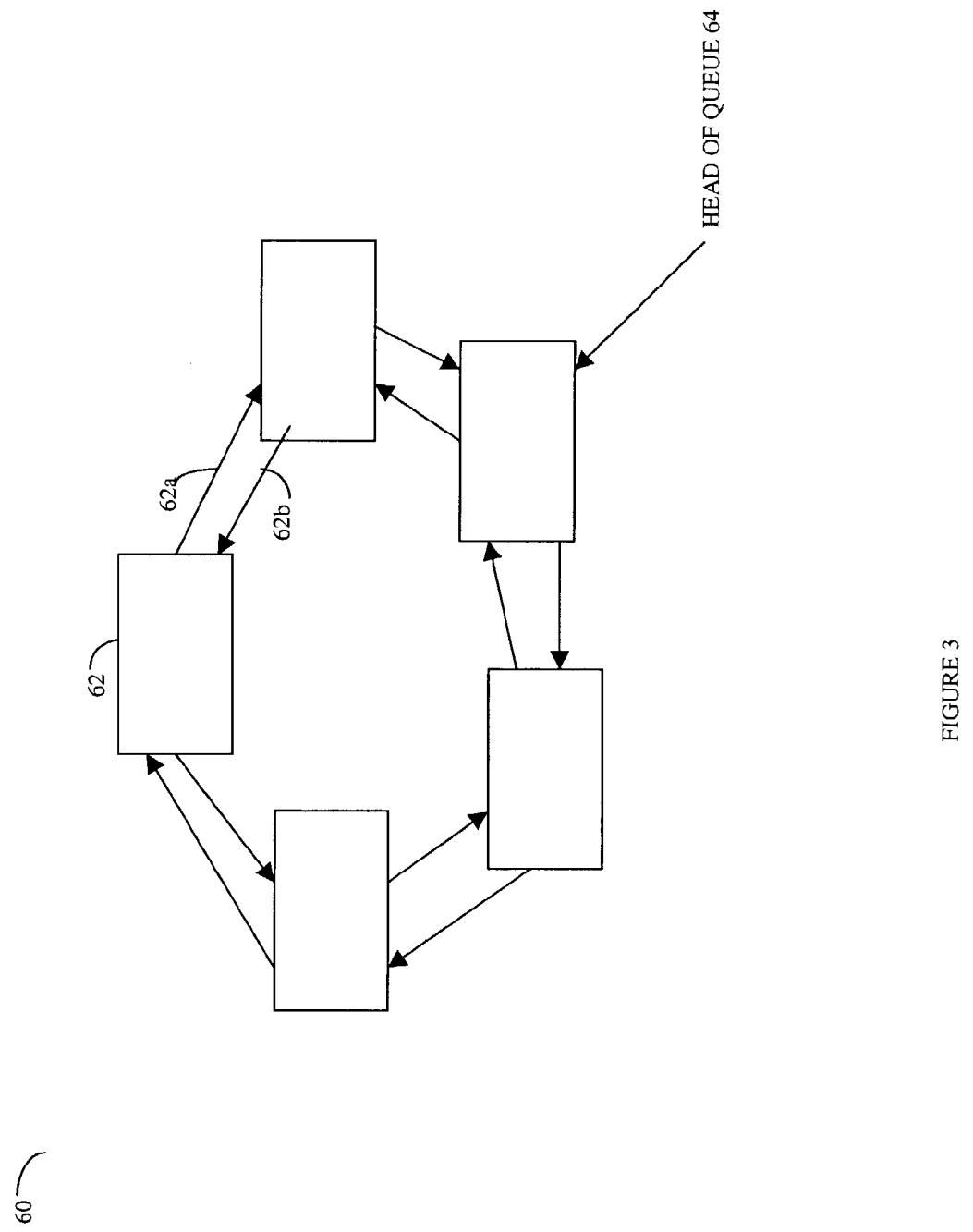
FIG. 3 is an example of an embodiment of a queue that may be used in implementing a cache.

Referring now to FIG. 3, shown is an example of an embodiment 60 of a replacement queue. Shown in the representation 60 is a circular structure in which each of the elements, such as 62, corresponds to a cache slot. Each cache slot may correspond to a portion of memory, such as one or more memory blocks. Each memory block may correspond to, for example, a track on one of the drives shown in connection with FIG. 2. In this representation, each of the slots are connected to other slots by forward and backward pointers, such as 62a and 62b, in a doubly linked list arrangement. Additionally, the head or beginning of the replacement queue is designated by a head pointer 64.

It should be noted that as described herein, an embodiment may include a cache which is in the form of the replacement queue using doubly linked list or other data structures known to those of ordinary skill in the art. The replacement queue described herein should not be construed as a limitation to the techniques described herein. Additionally, it should be noted that an embodiment may use a least-recently-used or other technique in determining which slots remain in the cache and which ones are removed.

Figure 4A:
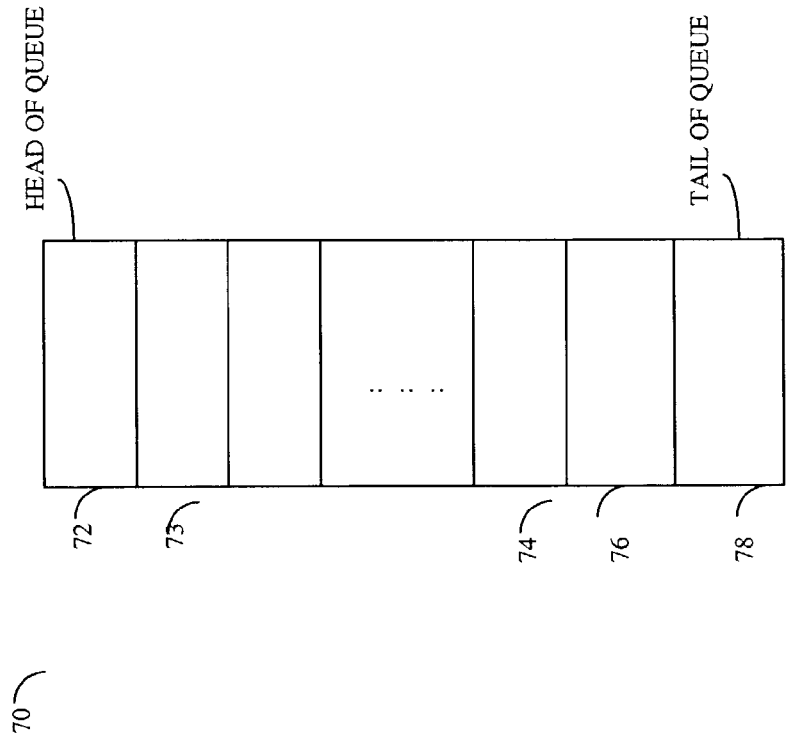
FIG. 4A is another representation of the queue of FIG. 3.

Referring now to FIG. 4A, shown is an equivalent representation 70 of the previously described replacement queue 60 in connection with FIG. 3. The representation shown in FIG. 4A is a logical equivalent of the representation shown in FIG. 3. The representation 70 of FIG. 4A logically corresponds to that in FIG. 3 such that, for example, element 72 corresponds to the beginning cache slot as noted by the head of the replacement queue pointer 64 in connection with the previously described figure. Similarly, the last element of the replacement queue is denoted by slot 78 which in this example is labeled also as the tail of the replacement queue. Elements or slots may be inserted into the list at the head of the replacement queue and exit or leave the cache at the tail of the replacement queue. For example, when an element is deposited into the cache, it may be placed at the head of the replacement queue in slot location denoted by 72 in connection with a read operation. Additional elements may be progressively added to the head portion or other location within the replacement queue 72. As elements are added to the queue, subsequent elements progress toward the tail of the list. When another slot is added to the replacement queue at position 72, the slot currently at position 72 moves to that slot designated as position 73 and the newly added element falls into the position of element 72.

An element may be placed in the replacement queue, for example, when an element is referenced in connection with an I/O operation such as a cache miss for a read operation, or in connection with processing pending write operations, for example. Once in the replacement queue, an element progresses through the replacement queue from the head 72 towards the tail 78 of the replacement queue.

The foregoing queue arrangement in connection with a cache or shared memory may have drawbacks. For example, exclusive access to the queue may be implemented using a locking mechanism that only allows a single process to access the entire queue. Additionally, pointer manipulation in connection with performing management operations may also be expensive.

Figure 4B:
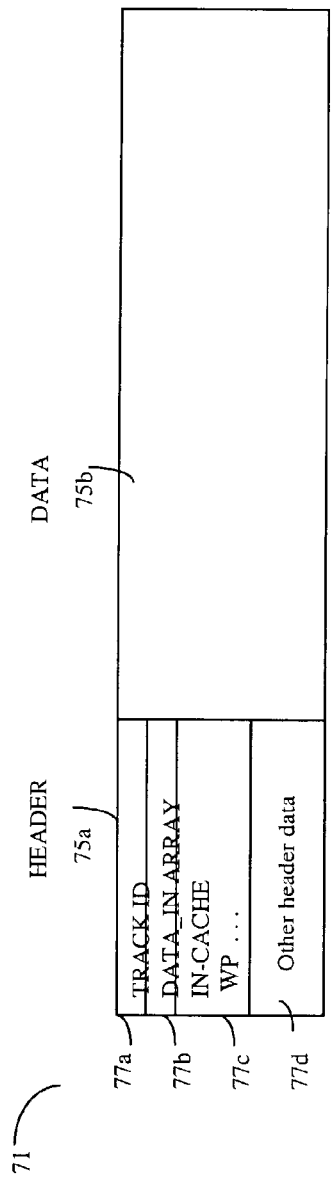
FIG. 4B is an example of an embodiment of a cache slot.

Referring now to FIG. 4B, shown is an example of an embodiment of a cache slot. The representation 71 shows more detail of an entry of a cache slot, such as a cache slot that may be included an embodiment of cache data structure of FIGS. 3 and 4A. In this example representation 71, a cache slot may include a header portion 75a and a data portion 75b. When a cache slot is assigned to a track, the track's identifying data is stored in the slot's header. The header portion 75a may include one or more other sections including a track ID section 77a, an DATA_IN ARRAY section 77b, a FLAGS section 77c, and optionally other header data in section 77d. The TRACK_ID section 77a may include an identifier of the particular track which is associated with this cache slot. The DATA_IN ARRAY 77b may be implemented as, for example, a bit array or bit vector in which each bit position corresponds to a particular block of data of the associated track. A value of one (1) in a particular bit position in the DATA_IN array indicates that a particular block of the associated track is included in the data portion 75b at the slot 71. A zero (0) indicates otherwise.

The FLAGS section 77c may include one or more bit flags or other types of flags to indicate a certain status about the data included in 75b and the like. For example, in one embodiment, the FLAGS section 77c includes a flag called IN-CACHE which indicates whether a particular track has an associated cache slot. IN-CACHE with a value of one (1) in this embodiment indicates that this particular slot is assigned to a track as indicated in the TRACK_ID section 77a. The WP or write pending flag indicates whether data included in this particular cache slot is associated with a write pending operation. It should be noted that other embodiments may include other organizations in connection with a cache slot. Additionally, an embodiment may also include other information in the particular header; for example, such as additional flags other than as described herein.

As described herein, a track is a portion of the particular device which in this example has a size of 32 K bytes of data and is the same amount that may be included in a single cache slot. It should be noted that other embodiments may have different size cache slots associated with different logical entities on a particular device of different sizes.

The flag in the section 77c IN-CACHE may be set when a slot is assigned to a track. When IN-CACHE is one (1), the slot may or may not hold a portion of the track's actual data in the section 75b. The fact that a particular slot is assigned or associated with a track is indicated by the value of the flag IN-CACHE being equal to one. In other words, the flag IN-CACHE having a value of one (1) does not indicate a status of whether or not there is data included in the actual data portion 75b. The section 77b DATA_IN ARRAY may be implemented as an array or a bit vector that includes a bit associated with each block of data of a particular track or slot. A value of one (1) in a particular entry in the bit array indicates that the associated block is actually stored in the data portion 75b. A zero (0) in the DATA_IN ARRAY bit position indicates otherwise. The WP flag in the section 77c is set to one (1) when a block is received from the host and is to be written to the cache slot. When a disk adapter or a DA actually writes data out to a device, the WP flag, for example in this Section 77c, may be set to zero (0) to indicate that the data is no longer write pending.

It should be noted that the foregoing notations described in connection with a cache slot are used in the following description for performing data operations in one embodiment. In connection with a read operation, the DA reads the data requested from the device and stores it in a cache slot. The DA, for example, may obtain a cache slot if there is not already one allocated and associated with a particular track ID as indicated in the track ID table or cache index 80, described elsewhere herein. The data is read from the device by the DA and stored in the cache slot 75b with the appropriate bits set 77b, 77c to indicate the state of the data included therein. Additionally, the track ID table or cache index 80 may also be updated in accordance with the particular data operation.

In one embodiment, data that is to be written to a device is first stored in a cache slot and marked as a write pending. The data is then actually written out to the device at a later point in time. Use of a cache as a temporary holding place for received data to be written and other techniques may be employed in an embodiment to process the incoming write requests since the actual writing of data to a device may be characterized as comparatively slower when compared to the rate at which data is transferred to the target location.

It should be noted that a slot may be indicated as free or not associated with a track when the IN-CACHE flag in section 77c has a value of zero.

Figure 5:
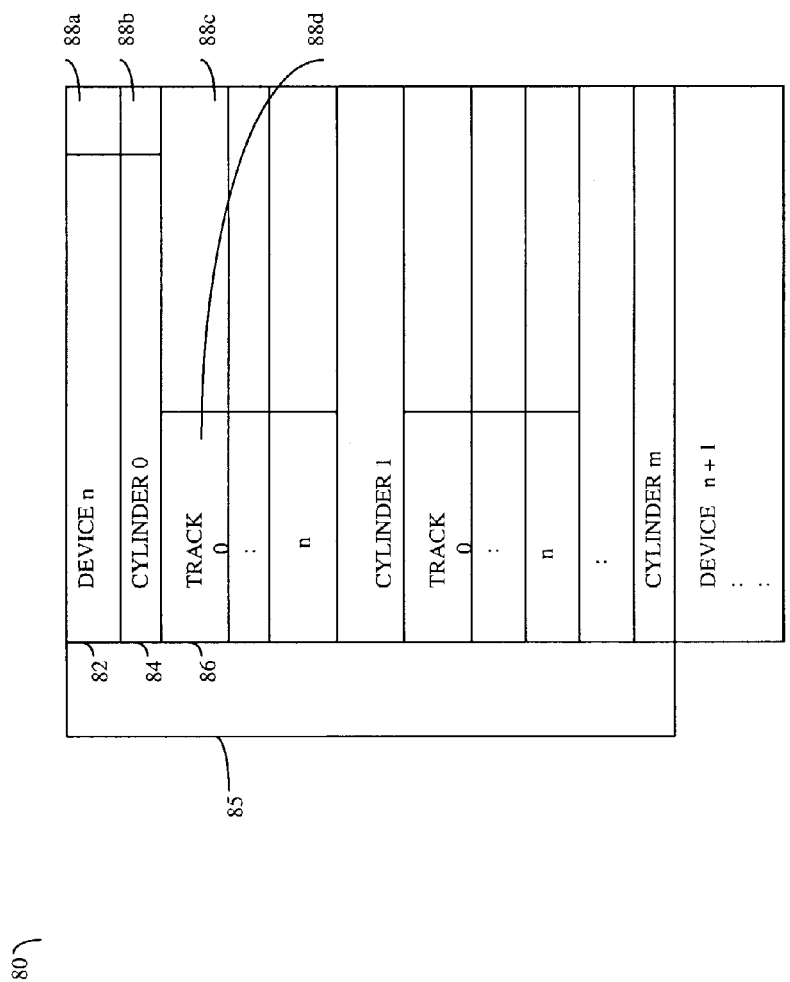
FIG. 5 is an example of an embodiment of a cache index or directory.

To indicate the data that is stored in the cache, a cache index or directory may be used. An embodiment may implement this using any one of a variety of different arrangements and structures. FIG. 5 shows one particular representation illustrating a device-by-device cache mapping.

Referring now to FIG. 5, shown is an example of a representation of a cache index/directory table or track ID table. The table 80 may be organized on a device-by-device level to indicate for a particular portion of a device, is the portion in cache, and if so, where in cache is it located. An embodiment that includes devices, for example, such as disks, may include a further refinement or granularity in the table 80 corresponding to a location in cache.

The table 80 may include a hierarchical structure relative to the structure of a disk, such as cylinders and tracks on a disk. Each device, such as device n, may have a corresponding portion 85 included in the table. Each of the portions 85 may further be divided into sections in accordance with the disk structure. A portion 85 may include device header information 82, information for each cylinder 84 and for each track within each cylinder 86. For a device, a bit indicator 88a may indicate whether data associated with the device is stored in cache. The bit indicator 88b may further indicate for a particular cylinder within a device, is any data stored in the cache. Associated with each track may be a corresponding portion 88c indicating whether data associated with a particular track is in the cache and an associated address of where in the cache the data for a particular track may be found, for example, in connection with performing a read operation or a pending write operation. The portion 88d may include other information associated with a particular track, such as a valid cache address if data is stored in the cache for the particular track.

Figure 6:
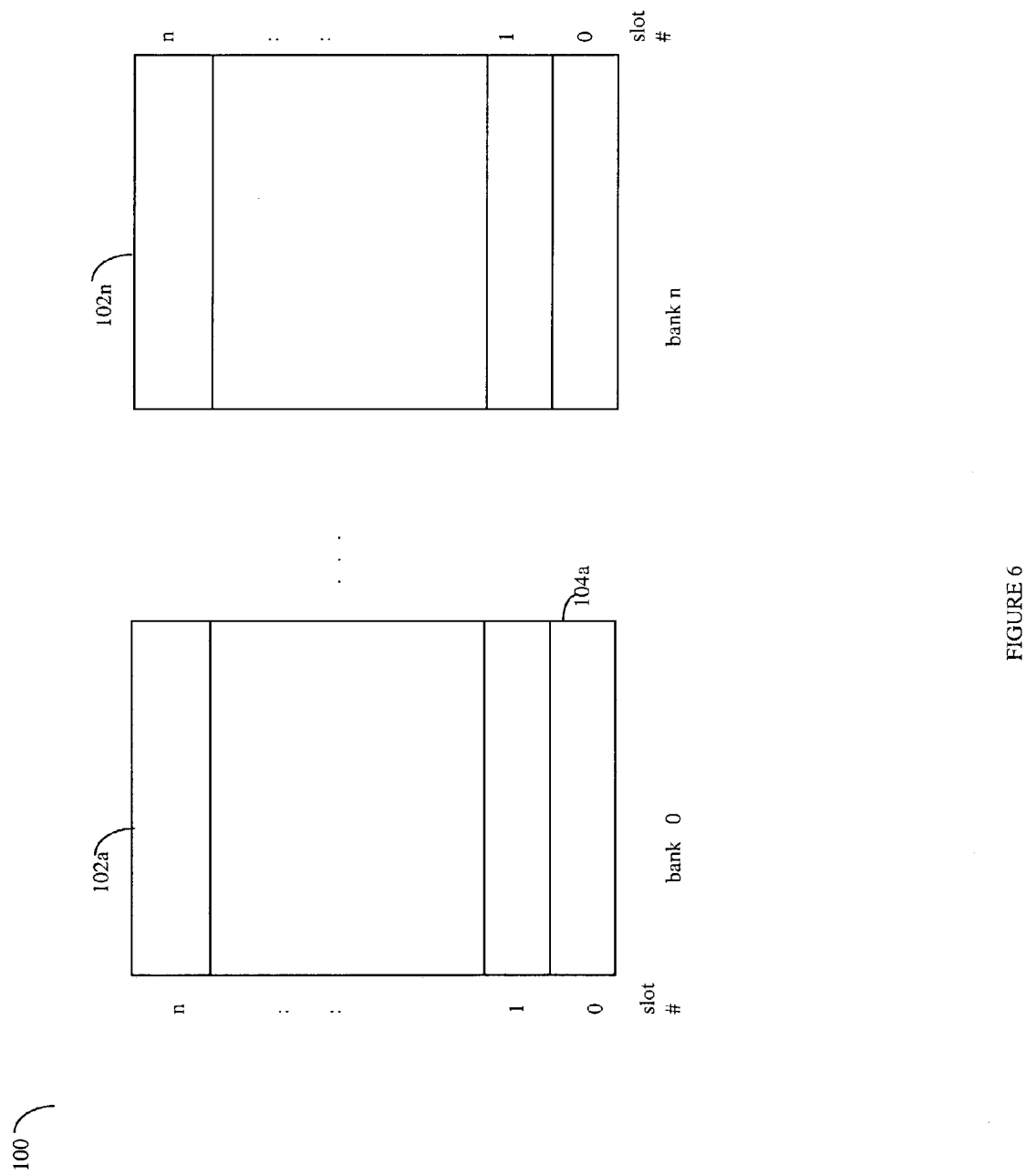
FIG. 6 is an example of an embodiment of a cache organization having a plurality of memory banks.

Referring now to FIG. 6, shown is an example of another representation of a cache in one embodiment. In this illustration, the cache 100 is organized into memory banks 102a–102n corresponding, respectively, to bank 0 through n. Each memory bank may be further divided into slots. Each memory bank, such as 102a, may include a control slot, such as 104a that includes information regarding the slots included in the respective memory bank.

It should be noted that the cache index or directory as shown in FIG. 5, for example, may be used in connection with any one or more of a variety of different cache arrangements, such as those in FIG. 3 as well as FIG. 6.

Figure 7:
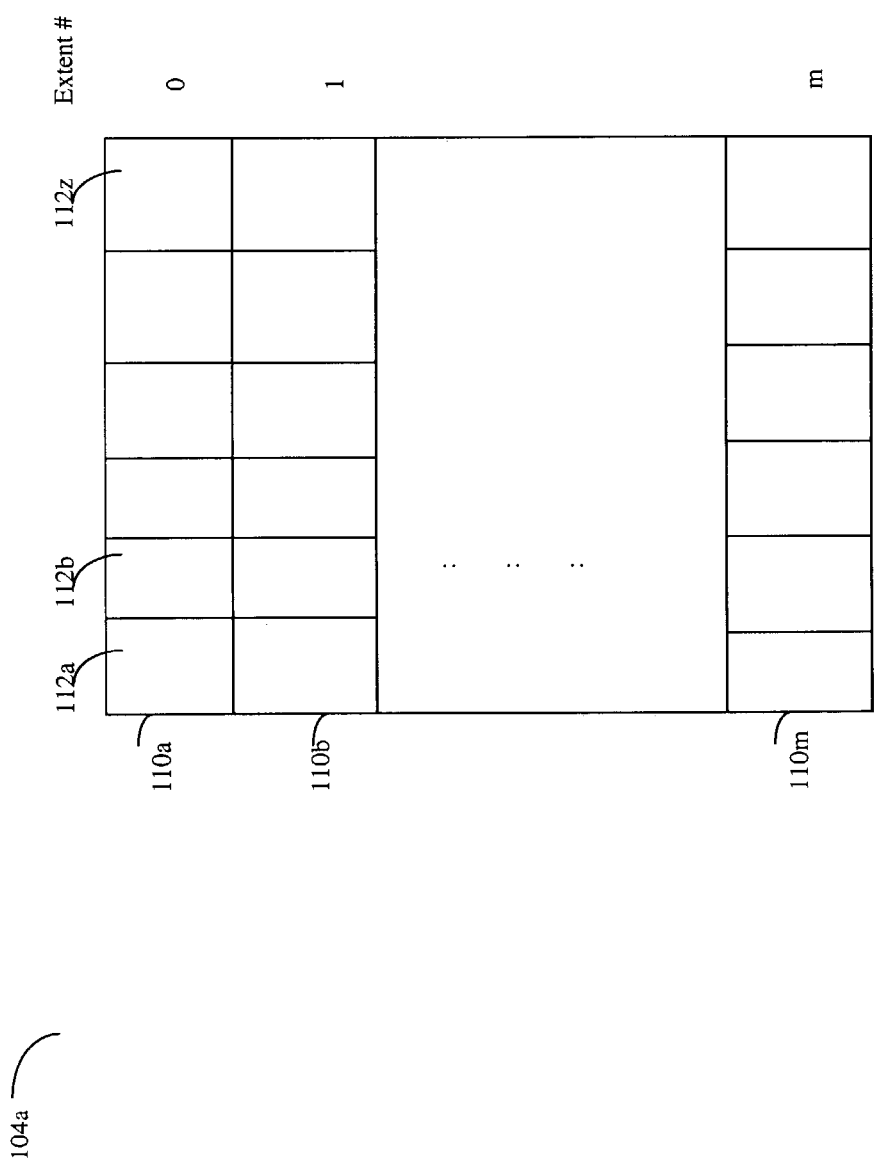
FIG. 7 is an example of an embodiment of a control slot associated with each memory bank.

Referring now to FIG. 7, shown is a more detailed description of the control slot 104a from FIG. 6. The control slot 104a may include information about the other slots in the memory bank. In this example, the control slot 104a may be further divided into extents or groups of tags, such as 110a–110m. Other slots in the memory bank 102a that includes control slot 104a may have a corresponding tag, such as 112a. In one embodiment, the tag size selected is 2 bytes or 16 bits. However, other tag sizes may be used in other embodiments. The tag may include information about the associated cache slot and is described in more detail in following paragraphs.

Each extent, such as 110a–110m, may refer to a number of tags that may vary in accordance with each embodiment. In one embodiment, the number of tags in an extent is the number of tags which may be read in a single direct memory access (DMA), for example, by a DA. Each chunk or portion may include, for example, 188 or 192 tags. Other numbers of tags may be associated with a single chunk or portion that may vary in accordance with each embodiment.

An embodiment may store the cache directory or table, cache, or portions thereof in global memory, for example, as included in FIG. 2 for a particular data storage system. Once in global memory, a DA may perform a DMA (direct memory access) and obtain a copy of a portion of the tags. The portion of the tags may be placed on another portion of memory local to the DA and utilization of this local copy is described in following paragraphs.

Figure 8:
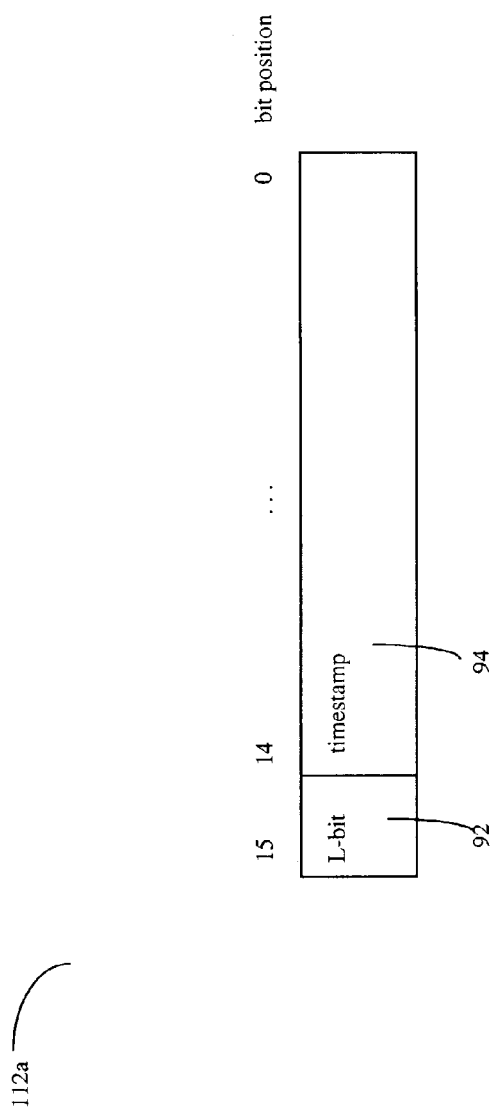
FIG. 8 is an example of a tag as included in the cache slot of FIG. 7.

Referring now to FIG. 8, shown is a more detailed representation of a tag 112a as included in FIG. 7. The 2 byte tag 112a includes an L-bit 92 and a 15 bit time stamp value 94. The L-bit, which may be the upper bit in the 2-byte tag arrangement, may be used to indicate the availability of a cache slot associated with the particular tag. This L-bit may be used in performing operations in which a processing step may be to obtain a cache slot. Associated processing operations are described in more detail elsewhere herein in following paragraphs. The time stamp value indicates, within a particular resolution, such as ½ second, when the associated slot was last used. For example, when there is a cache "hit" to a particular slot, the associated time stamp is updated with new time stamp value.

One technique may determine which slot to use, for example, by determining the age of each slot using the associated time stamp and selecting the oldest one. Additionally, an embodiment may also use a special time stamp value to indicate that a tag corresponds to a slot which is available and includes data that is not relevant. A tag corresponding to a slot including data that is not relevant may also be referred to as a scratch slot in a pool of available slots.

Data may be stored in the cache in connection with performing data operations. Different processing steps may be performed using the cache in connection with performing different data operations. For example, when a read request is received from a host computer, a determination may be made as to whether the requested data is in the cache. If so, the data is returned. Otherwise, the data may be read from the particular data storage device, stored in the cache and then sent to the host system. A slot from the cache is determined in which to store the data. When a write operation is performed, an embodiment may stored the data in the cache as a pending write which is actually written to memory at some later point in time in accordance with system specific policies. When the data is written to memory, a cache slot may be freed to be added to the pool of available or "free" slots. What will now be described are processing steps that may be performed in an embodiment in connection with cache management operations, for example, such as those just described for read and write operations.

Figure 9:
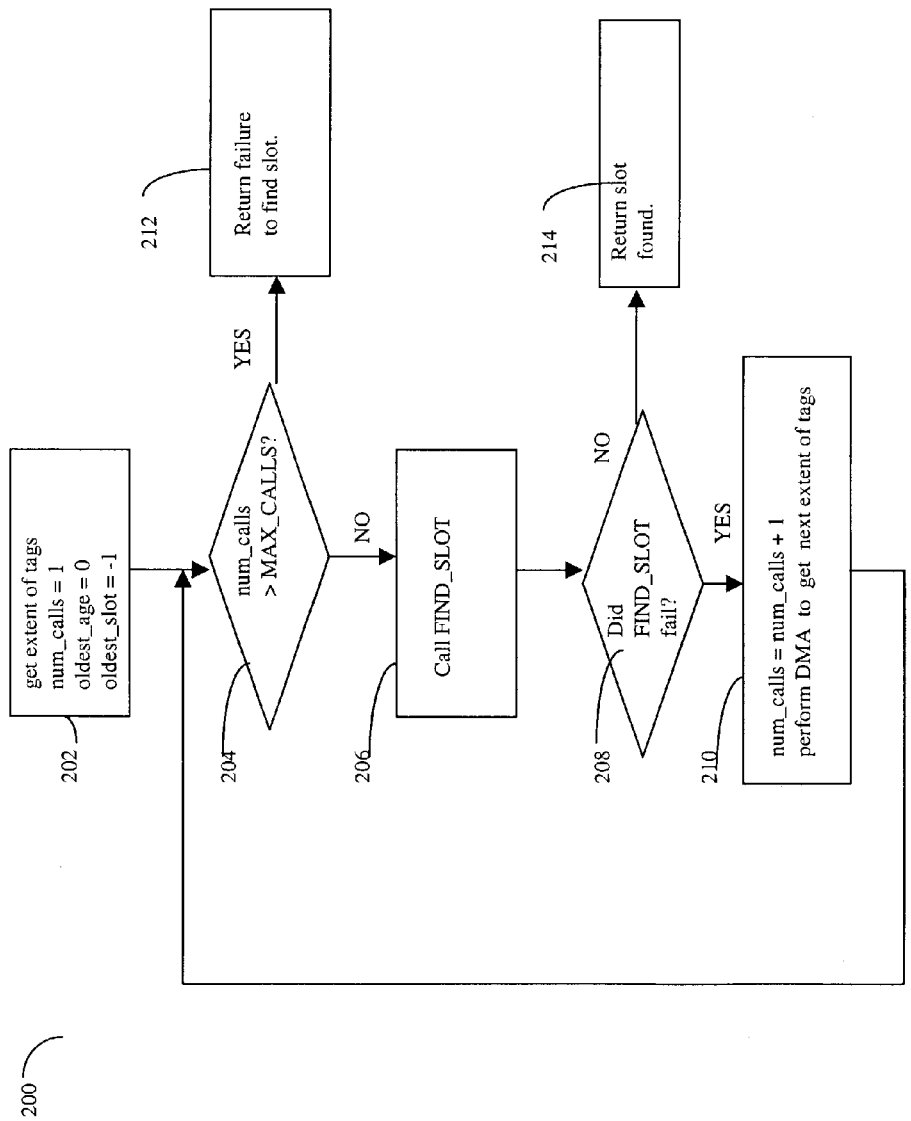
FIGS. 9–12 are flowcharts of processing steps of an embodiment for obtaining a cache slot.

Referring now to FIG. 9, shown is a flowchart of steps of an embodiment for obtaining a slot from the cache. Generally, the technique searches for an available slot or displaces the oldest slot. These steps may be performed by each DA or other processor, for example, within a system such as described in connection with FIG. 2.

At step 202, a first extent of tags is read from global memory and a local copy is made. Additionally, variable num_calls is initialized to 1, oldest_slot=-1 and oldest_age to 0. Num_calls tracks the number of times FIND_SLOT is called and fails after a predetermined number. Oldest_age tracks the age of the oldest slot and oldest_slot accordingly is an identifier corresponding to the oldest slot. Control proceeds to step 204 where a determination is made as to whether the number of calls exceeds a predetermined maximum, MAX_CALLS. If so, control proceeds to step 212 where a failure is returned. Otherwise, control proceeds to step 206 where a routine FIND_SLOT is called, which is described in more detail in following paragraphs. FIND_SLOT attempts to locate and return a cache slot for use. It should be noted that MAX_CALLS may be a predetermined value that may vary in accordance with each embodiment. For example, in one embodiment, MAX_CALLS is 100.

It should be noted that in connection with step 202, a new extent or portion of tags may be obtained with each invocation of steps of flowchart 200. Thus, each time each processor attempts to find a slot within an extent of tags, a new extent of tags is obtained. This technique may be used in connection with distributing the number of slots available for use in any particular extent to approximate a uniform distribution. It may be desirable to have a uniform distribution of the number of free slots in any particular extent. Using a new extent each time is one technique that may be used in connection with attempting to obtain the uniform distribution of slots available for use.

Additionally, when there are multiple processors each attempting to locate an available slot, techniques may be used in connection with determining the next subsequent extent of tags for each processor in order to minimize clustering. In other words, techniques may be used such that each processor attempts to locate an available slot from different extents of tags to minimize the likelihood that a first and a second processor look in the same extent of tags. Accordingly, these techniques may also minimize the likelihood that any two processors may be attempting to access the same available slot. Techniques for use with multiple processors, such as using a relative prime extent increment, are described elsewhere herein in more detail.

Experimentation by the inventors has shown that use of the foregoing techniques may result in a distribution of the number of free slots in any given extent of tags which approximates a uniform distribution as a best case and a normal distribution as a worst case.

Control proceeds to step 208 where a determination is made if FIND_SLOT succeeded or failed in locating a cache slot for use. If a slot is found, control proceeds to step 214 where the determined slot is returned. Otherwise, if FIND_SLOT failed, control proceeds to step 216 where num_calls is incremented by 1 and a global memory read is performed to get the next extent of tags. Control then proceeds to step 204 where processing then continues.

Figure 10:
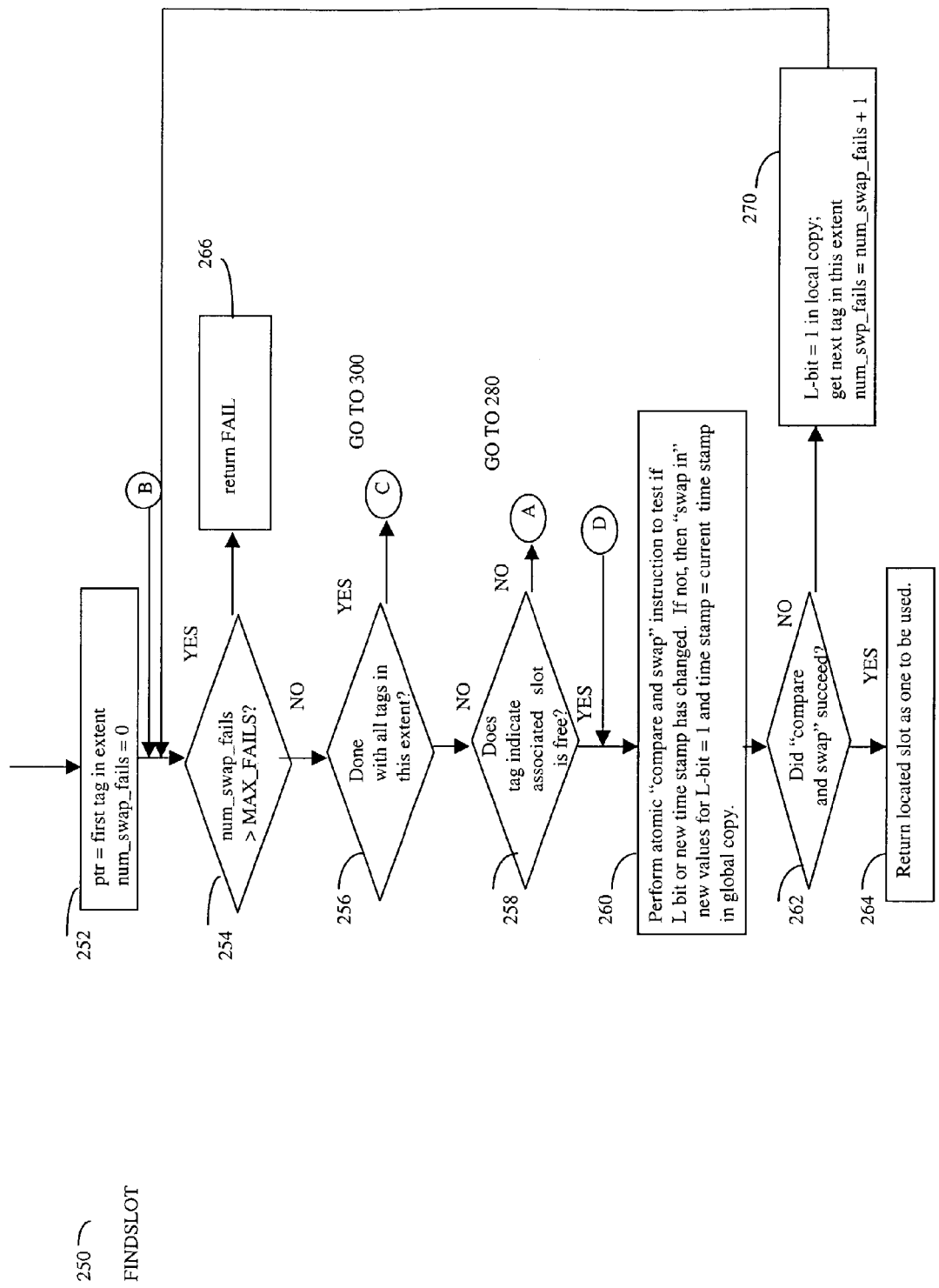

Referring now to FIG. 10, shown is a flowchart 250 of processing steps performed in connection with the FIND_SLOT routine. At step 252, ptr is assigned to point to the first tag in the current extent of tags. Additionally, the num_swap_fails tracking variable is initialized to 0. num_swap_fails counts the number of failed swaps as described in following paragraphs. At step 254, a determination is made as to whether num_swap_fails exceeds a predetermined maximum. In one embodiment, MAX_FAILS may be 4. Other embodiments may have other values for MAX_FAILS that may vary from that described herein. It should be noted that each DA, director or processor has its own unique ptr such that each DA, for example, may attempt to obtain a slot from locations different than that of other DAs. If a determination is made at step 254 that the maximum number of failed swap attempts has been exceeded, control proceeds to step 266 where failure is returned. Otherwise, control proceeds to step 256.

Figure 12:
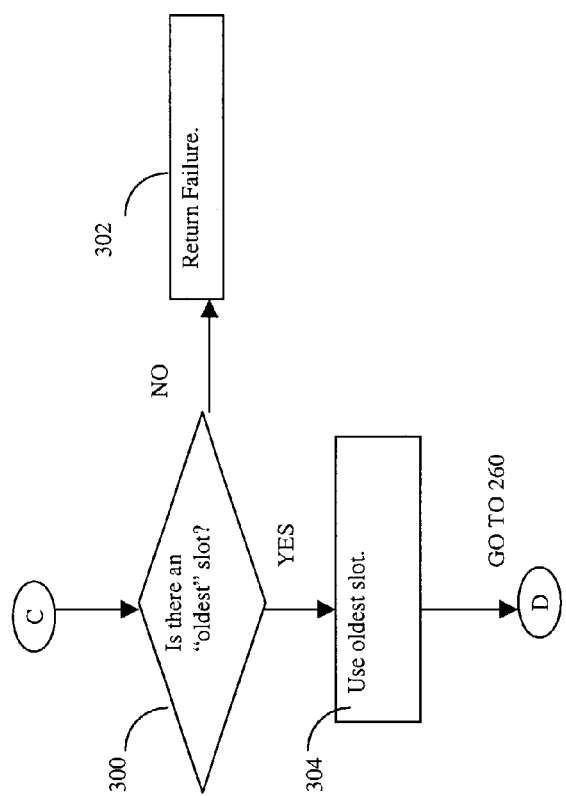

At step 256, a determination is made as to whether processing is complete for all tags in this extent. If so, control proceeds to step 300 in FIG. 12 where a determination is made as to whether there is an "oldest" slot. If so, this slot is used as the available slot, as in step 304, and control proceeds to step 260. Otherwise, control proceeds to step 302 where failure is returned.

If, at step 256, a determination is made that all tags in this extent have not been examined, in accordance with the local copy, control proceeds to step 258 where a determination is made as to whether the current slot identified by the current tag is free or available. In accordance with the embodiment described herein, this may be determined using the time stamp where a particular value may be placed in each time stamp field when a corresponding slot is returned to the pool of free or available slots. Any particular value may be used in an embodiment, such as a time stamp of 0, which may vary in accordance with each embodiment. If it is determined that the current slot is free, control proceeds to step 260 where an atomic operation may be performed. In one embodiment, this may be performed using an atomic "compare and swap" instruction which tests the L-bit and time stamp of the current tag to see if the values of either have changed since the determination at step 258. If the values have not changed, then the instruction also "swaps in" or updates values of the L-bit and time stamp fields by setting the L-bit to 1 and setting the time stamp to be that of the current time. It should be noted that this update of the current tag is performed to the copy in global memory. Additionally, the processing performed at step 260 is also performed using the copy from global memory.

Performing the compare and swap as an atomic, uninterrupted operation may be used to guarantee exclusive access to the shared resource of the cache or shared memory since, for example, multiple DAs may be attempting to access the same portion of shared memory, such as the same cache slot. The determination at step 258 may be performed, for example, by two different DAs reaching the same conclusion that a particular slot is available. However, only one of the DAs may actually be granted or obtain the slot since the atomic compare and swap operation may only be performed by one DA at a time in an uninterrupted fashion. The second DA's compare and swap will result in failure in that the values were changed by the first DA's successful execution of the compare and swap instruction.

The processing performed in connection with step 260 may be performed atomically using other instructions and/or techniques known to one of ordinary skill in the art, for example, in connection with accessing a shared resource such as the shared memory or cache as described herein. One example of the atomic performance or processing steps is the atomic "compare and swap" instruction which may be implemented in hardware and/or software. Another embodiment may utilize other techniques in performing an equivalent of this atomic operation by performing the following pseudo-code steps:

1. lock portion of shared resource
2. if L bit or time stamp has changed
   then FAIL and unlock shared resource
   else /*SUCCESS*/
      swap in new values as in step 260
      unlock shared resource The foregoing may be implemented used different mechanisms and techniques included in a system for providing exclusive access to a shared resource, such as the shared memory used as the cache in this instance.

It should be noted that the granularity used in connection with the lock and unlocking of a resource may vary in accordance with each particular embodiment. For example, in one embodiment, a locking mechanism may be provided which locks a minimum of a word size. Other embodiments may have other limitations. It may be desirable to lock for exclusive access the smallest amount or unit allowable within limits of a particular system which is also the size of a tag or portion thereof being accessed by multiple processors.

At step 262, a determination is made as to whether the compare and swap instruction succeeded. If so, control proceeds to step 264 where the located slot is returned as the one to be used. Otherwise control proceeds to step 270 where the L-bit is set in the local copy so that this slot is not examined again. The next tag is obtained in the current extent and the num_swap_fails is incremented by 1. Control proceeds to step 254.

Figure 11:
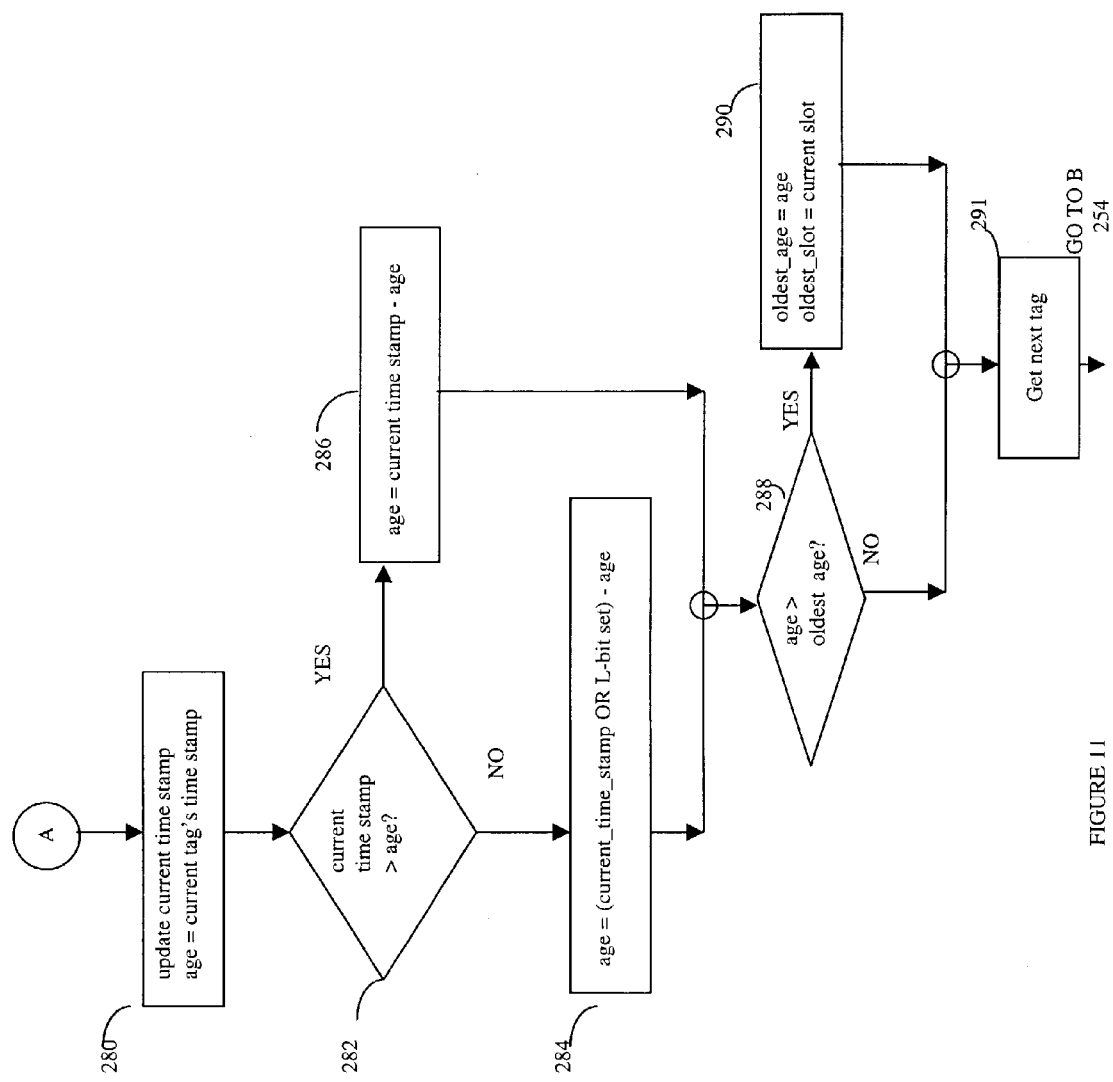

If a determination is made at step 258 that the current tag is not free, control proceeds to step 280 which is continued in FIG. 11. At step 280, the current time stamp is updated and the temporary variable age is assigned the current tag's time stamp value. It should be noted that the processing step of updating the current time stamp may be performed in any one of a variety of different increment units. For example, in one embodiment, current time stamp may be updated in increments of 4 units. In this example, multiple processors may be using the same cache in which each of the processors has its own clock and associated time used in connection with time stamps. Each of the processor clocks may have time synchronization differences such that at a particular point in time, time stamps produced by any two of the clocks may differ. A time stamp increment, such as 4 units, may be selected in accordance with any such synchronization differences when comparing or using time stamp values as in processing herein. In one embodiment, the increment is 4 units=2 seconds, each unit being ½ second. This increment amount may vary in accordance with embodiment.

At step 282, a determination is made as to whether the current time stamp is greater than the age. If so, control proceeds to step 286 where age=current time stamp−age. Otherwise, control proceeds to step 284 where age=(current time stamp OR L-bit set)−age.

The processing at steps 282, and 286 obtain an absolute value of the age of the current slot which is a difference of the amount of time from when the slot was last used subtracted from the current time. The processing of steps 282, 284 and 286 are used in connection with handling time stamp values which "wrap around" for very large values causing the L-bit to be set. When this point is reached, the age starts over at a new value similar to a counter which, when its maximum is reached, is reset.

Control proceeds to step 288 where a determination is made as to whether the age of the current slot is greater than the oldest_age of the slots visited thus far. If so, control proceeds to step 290 where information is retained about the current slot, such as updating the oldest_age and the corresponding identifier. At a next step 291, the next tag in the current extent is obtained. Control then proceeds to step 254.

As data associated with a slot is moved in and out of cache, the cache index or directory, for example as illustrated in FIG. 5, may accordingly be updated.

It should be noted that in the foregoing embodiment using tags for cache management, a particular slot may be noted as "not available" if the L-bit is set (=1) in a global copy. A cache slot which is "not available" may be characterized as one that includes volatile data and should not be removed from the cache. Use of the L-bit as a technique for indicating when a slot is not available may be used to manage a shared cache, for example, rather than an using a cache implementation with linked lists and pointers as described elsewhere herein. Similarly, a slot may be indicated as "available" by clearing (=0) the L-bit. The associated time stamp may be set to any one of different values affecting when a particular slot may be selected for use. For example, the time stamp may be set to a value of 0 indicating that the data in the cache slot is invalid.

Adjusting the time stamp to different times may be used when freeing a cache slot, such as, for example, when setting the L-bit to 0. The time stamp may be set to a particular value to indicate an age of a slot. As described elsewhere herein, clearing the L-bit and resetting the time stamp to 0 in a global memory copy of a tag may be used to indicate that this slot should be selected prior to others having non-zero time stamps. A time stamp of zero in this instance may be used to indicate that the cache slot contains meaningless data. A non-zero time stamp may also affect when a particular cache slot is selected, for example, since the "oldest" cache slot may be selected from all time slots having non-zero time stamps. It should be noted that in a cache slot with an L-bit=0, a non-zero time stamp may be used to indicate that although the slot is "available", the slot does contain valid data that may also be used, for example, in connection with a write pending data portion that has been written out to disk and subsequently for some time the data still remains in the cache. Accordingly adjusting the time stamp may cause the age determination of the associated slot to vary. This technique may be used in connection with causing data in particular slots to remain in the cache for longer or shorter periods of time. This time stamp adjustment may be used, for example, as an alternative to physically inserting a slot at different points in a cache data structure, for example, such as in adjusting pointers in a linked list. Depending on techniques and policies that may be included in each embodiment, it may be desirable to have slots of data having particular characteristics remain in cache longer than other slots having other characteristics.

In particular, an embodiment may adjust the time stamp value of an associated slot in accordance with the Fall Through Time (FTT). Generally, the FTT refers to the average amount of time it takes for an unpromoted slot once it is in the queue to exit the queue. In other words, it is the average amount of time it takes a slot to pass through or "fall" through the queue from the head position and then exit out of the queue through the tail position, for example, referencing the illustration of FIG. 4A. A slot may be added to the head position or at another position in accordance with the relative time stamps of those in the queue. The FTT is described in issued U.S. Pat. No. 5,592,432, Vishlitzky et al, which is incorporated herein by reference.

The FTT may be calculated for each slot by taking a first time stamp at the position when an element is lastly placed at the head of the replacement queue, and then taking a second time stamp value when that same slot exits the replacement queue (such as when a slot exits or leaves at the tail). The difference between the second ending time stamp value and the starting or first time stamp value for each particular slot may be used in calculating an average amount of time. It is this average amount of time that represents the FTT for a large number of slots.

It should be noted that in one embodiment of the foregoing, it was determined that the tags within each extent approximates a uniform distribution with respect to the time stamps.

An embodiment may provide different initial values for use with techniques described herein with different processors, for example, such as may be associated with a DA or other director. For example, in one embodiment, when determining the starting extent, each processor may begin with the first extent of a different memory bank. As additional extents are requested by each processor, a next subsequent extent may be obtained by updating the extent pointer address by an increment value also unique for each processor. For example, in one embodiment, each processor may have its own unique value and all the extent increments of all the processors may also be relatively prime. Additionally, the number of extents may not be a multiple of any prime number that is an increment extent value. The foregoing and other techniques may be used in an embodiment to minimize clustering of different processors in which different processors are attempting to obtain cache slots which are clustered together.

In one embodiment, each director or processor may have its own unique processor identifier number. This identifier number may be used in assigning an initial value for a starting extent for each processor. For example, each processor may be assigned an initial value of a starting extent number as follows:

embodiment, the memory may be organized into banks and number of extents in all banks refers to the total number of extents in all of the memory banks. As described elsewhere herein, each memory bank may include a particular number of extents that may vary in accordance with each embodiment. Another embodiment may use the processor identifier in connection with determining a random number used in selecting an initial value for each processor's starting extent.

In addition to selecting an initial value of a starting extent for each processor, an extent increment may be determined for how to select the next extent for each processor. In one embodiment, this increment may be the next sequential extent for each processor, for example, determined by adding a constant of one (1) to a current extent number. Other embodiments may use different techniques in determining the initial value of a starting extent and for an extent increment.

An embodiment may also utilize thresholds levels of available slots such that there is a minimum number of available slots. For example, in one embodiment, when the number of available slots (L-bit=0) falls below 20%, write pending operations are actually written to disk causing the associated cache slots to have the L-bit values cleared.

An embodiment may also use the foregoing cache management technique in a system which provides for also utilizing an alternate technique for cache management. This may be implemented, for example, utilizing a switch providing for selection of the foregoing technique or another, such as cache management using pointer manipulation.

The foregoing provides a flexible and efficient technique for cache management. Slots may be added or removed from the cache by updating values in an associated tag. Other embodiments may utilize pointer management techniques in accordance with particular data structure of the associate cache that may be more expensive in terms of execution time and memory. Exclusive access to the shared resource of the cache may be implemented utilizing the atomic instruction described herein or other equivalent. This may be used as alternative for a more expensive locking mechanism, for example, that may exclude all others from accessing any portion of the cache. It should be noted that the atomic instruction does not exclude all other from accessing the cache but rather guarantees performance of an atomic operation to a portion of the cache. Use of the foregoing techniques described herein may be more apparent in a system, for example, having a large number of processors accessing the shared memory, or those with a slow global memory access time.

It should be noted that the foregoing includes techniques used in connection with a portion of shared memory used as

```
for I = 1 to max for all processors
{
    current_proc_id = identifier of processor I;
    initial_extent_value_processor_pointer[I] =
        (number of extents in all banks * current_proc_id)/(max number of
                                                                  processors)
    I = I + 1
}
``` where I is an index over the range of all processors and each processor has an associated unique processor identifier. The initial value of a starting extent for each processor is selected in accordance with the unique processor identifier. In this a cache. These techniques may also be used in connection with other types of shared resources.

Techniques used in connection with cache management such as cache replacement and slot promotion policies may vary in accordance with the type of cache. Caches may be characterized in accordance with location and use in a computer system. Caches located in different portions of a computer system may have different access patterns resulting in different policies proving more efficient in accordance with the type of cache.

A first type of cache may be characterized as a first level buffer cache and a second type of cache may be characterized as a second level buffer cache. Accesses to a second level buffer cache may be characterized as misses from a first level buffer cache in a computer system. Second level buffer caches may have different access patterns. These different levels of buffer caches are described in more detail in following paragraphs.

Figure 13:
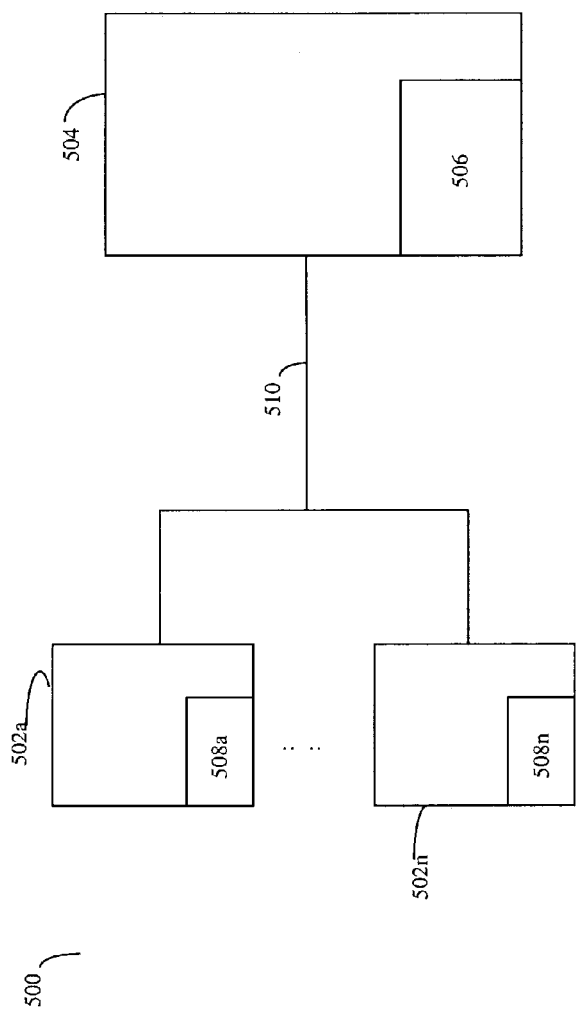
FIGS. 13 and 14 are examples of embodiments of secondary level buffer caching arrangements.

Referring now to FIG. 13, shown is an example of an embodiment of a computer system 500. The elements of the computer system 500 may be similar to those described previously in connection with FIGS. 1 and 2, for example. The computer system 500 in this example includes client computer systems 502a–502n. Each of the client systems 502a–502n may include, respectively, a first level buffer cache 508a–508n. Each of the client systems 502a–502n may communicate with the data storage system 504 over a communication connection and medium 510, such as a network or other communication medium described elsewhere herein.

The data storage system 504 may include a cache 506. The cache 506 may be referred to as a second level buffer cache. A client, such as 502a, may request data in connection with an I/O operation. The data may be stored locally within the cache 508a. If the data being requested is not in the local cache 508a, the client 502a may communicate with storage system 504 over communications medium 510 to request the data. The data storage system 504 may then look into its cache 506 for the requested data. An access to the cache 506 within the data storage system 504 is actually a cache "miss" to the first level buffer cache 508 included within the computer system of the client 502a.

Figure 14:
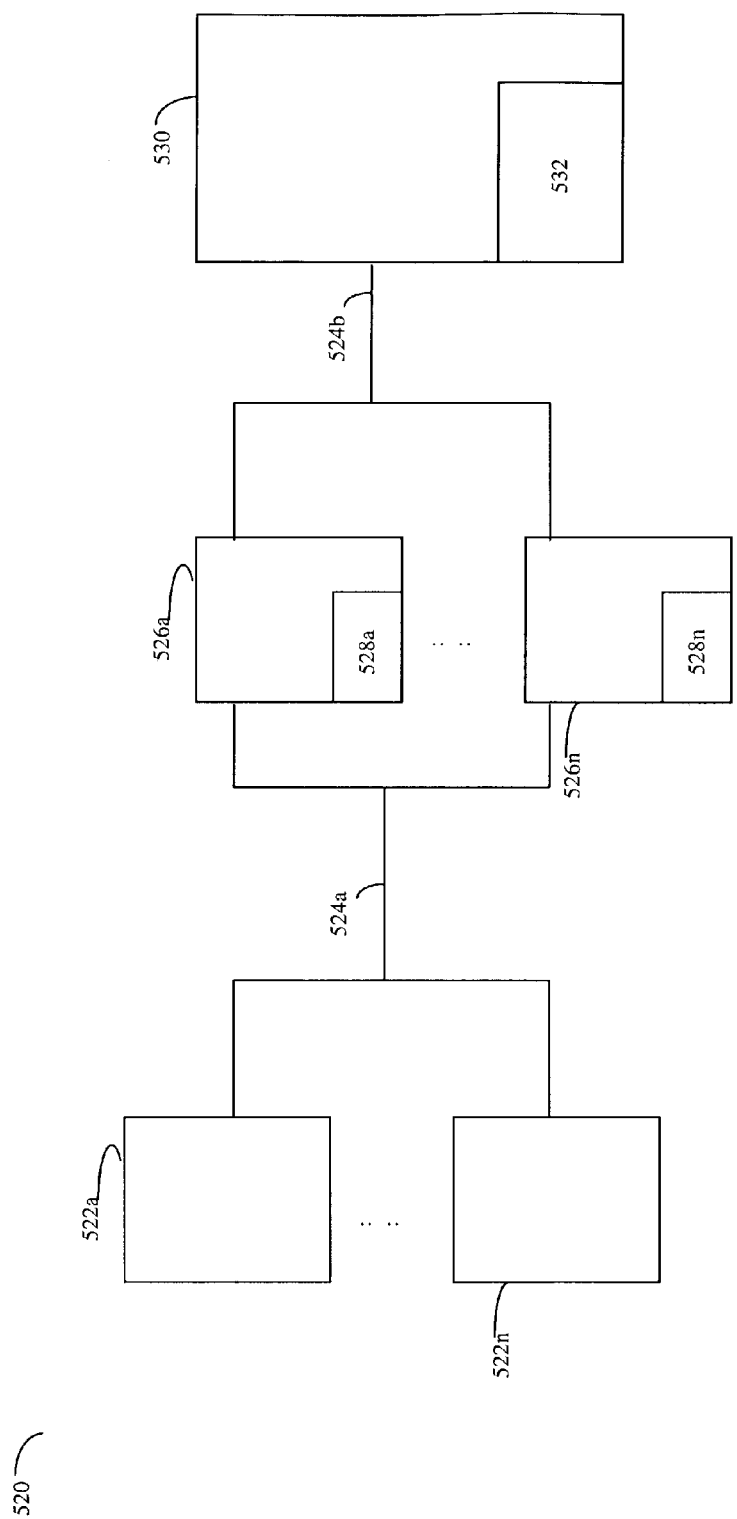

Referring now to FIG. 14, shown is another example of an embodiment of a computer system 520 that also includes first and second level buffer caches. The computer system 520 includes clients 522a–522n which communicate through communications medium 524a with a first level of servers 526a–526n. In this example, rather than store a first level cache of data locally within each of the clients, the first level of caching is included in the first level of the servers 526a–526n. The caches 528a–528n may be referred to as first level buffer caches. Servers 526a–526n may communicate over a communications medium 524b with the storage server 530 that includes a cache 532. The cache 532 may, in this instance, be referred to as the second level buffer cache.

The topology shown in the computer system embodiment 520 may exist, for example, with first level servers 526a–526n, such as database servers, that communicate with a second level server 530, such as a storage servers. The application executing within such a computer system embodiment may cause particular caching access patterns within first and second level buffer caches.

It should be noted that the computer systems 500 and 520 are two examples of embodiments of computer systems that may implement a first and second level buffer cache hierarchy. This may also be referred to as a multi-level caching hierarchy.

One point to note for both these examples having first and second level buffer caches is that the second level buffer cache may have different access patterns from the first level buffer cache since accesses to a second level buffer cache are actually first level buffer cache "misses". First level buffer caches may employ, for example, policies such as an LRU replacement policy such that the recently accessed blocks remain in the cache. However, employing the same technique within the second level buffer cache, such as a 532, may result in poor performance. Thus, it may be desirable to employ a different technique within a secondary level buffer cache such as may be included in a data storage system.

It should be noted that the techniques that will be described in following paragraphs for use in a second level buffer cache may be employed in an embodiment using any one of a variety of different data structures to represent the cache. For example, the techniques described herein for cache management may be used in a cache system employing a data structure for example, as described in connection with the data structure 60 of FIG. 3, the data structure 70 of FIG. 4A, as well as the data structure representing a cache described in FIGS. 6, 7 and 8. Modifications to steps that will be described in following paragraphs may be made as an implementation detail in accordance with implementing the techniques described herein in accordance with the particular data structure selected in a particular embodiment for each cache. It should also be noted that other levels of a multi-level cache hierarchy, besides the second level described herein, may employ the techniques described herein.

Within a particular cache such as may be included in a data storage system, tracks stored within the cache, such as one track per cache slot, may be referenced only once while others may be referenced or hit numerous times. The techniques that will be described in following paragraphs provides a way of putting a track on "parole" to wait for the second hit. If the same cache slot receives a subsequent second hit, the cache slot will be given a longer period of time within the cache queue. This technique that will be described in following paragraphs is in contrast, for example, to other techniques that may weight and promote tracks within the cache the same regardless of whether they were hit a single time or multiple times. In other words, the techniques described in following paragraphs distinguish between two types of cache hits where the first type of cache hit are those cache slots called or hit only once as opposed to a second type of cache hit which is a subsequent cache hit to the same slot which has already been referred to or hit once. A backup application may be an example of an application that references particular blocks and tracks only once in connection with performing a backup operation.

Figure 15:
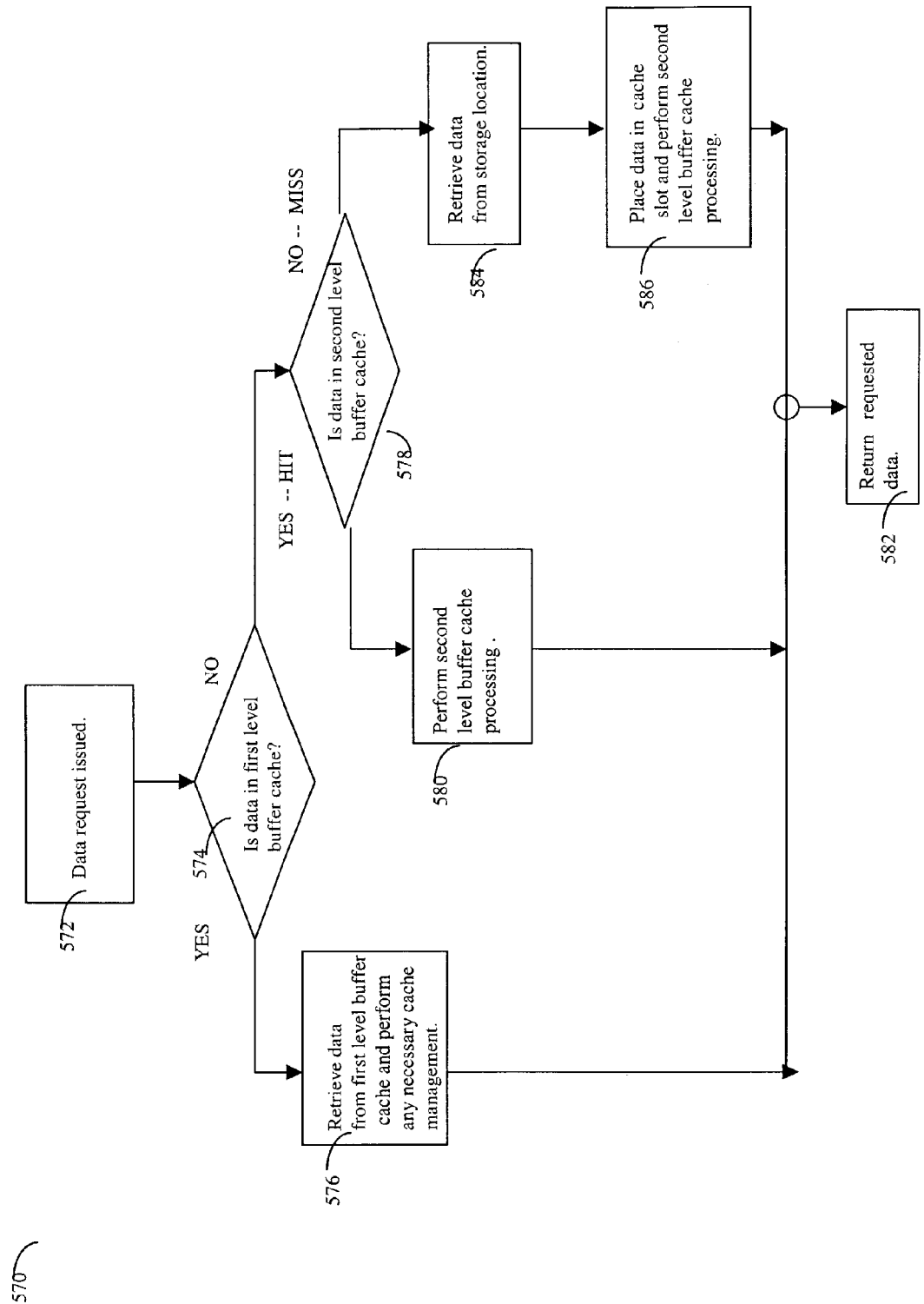
FIG. 15 is a flowchart of steps of a method for processing a data request within an embodiment having first and second level buffer caching.

Referring now to FIG. 15, shown is a flowchart 570 of steps of one embodiment that may be performed in connection with obtaining data for servicing a data request in a computer system having first and second level buffer caching. At step 572, a data request is issued, for example, by one of the host or client systems. Control proceeds to step 574 where it is determined if data is in the first level buffer cache. If it is determined that step 574 that data is in the first level buffer cache, control proceeds to step 576 where data is retrieved from the first level buffer cache and any necessary first level buffer cache management is performed. Control proceeds to step 582 where the requested data is returned.

If at step 574 it is determined that data is not within the first level buffer cache, control proceeds to step 578 where it is determined if data is within the second level buffer cache. If so, control proceeds to step 580 where second level buffer cache processing in accordance with this hit is performed. Subsequently, control proceeds to step 582 where the data that is request is returned.

If at step 578 it is determined that data is not within the second level buffer cache, control proceeds to step 584 in accordance with a second level buffer cache miss. At step 584, data is retrieved from the appropriate storage location, for example, as may be included within the data storage system on a device. Control proceeds to step 586 where data may then be placed in a cache slot included in the second level buffer cache. Any second level buffer cache processing may also be performed at step 586. Control proceeds to step 582 where the data that has been requested is returned.

It should be noted that the processing steps described in connection with flowchart 570 are general processing steps in connection with a first and second level buffer caching scheme. What will now be described are more detailed processing in connection with steps 580 and 586 for performing second level buffer cache processing and management.

Figure 16:
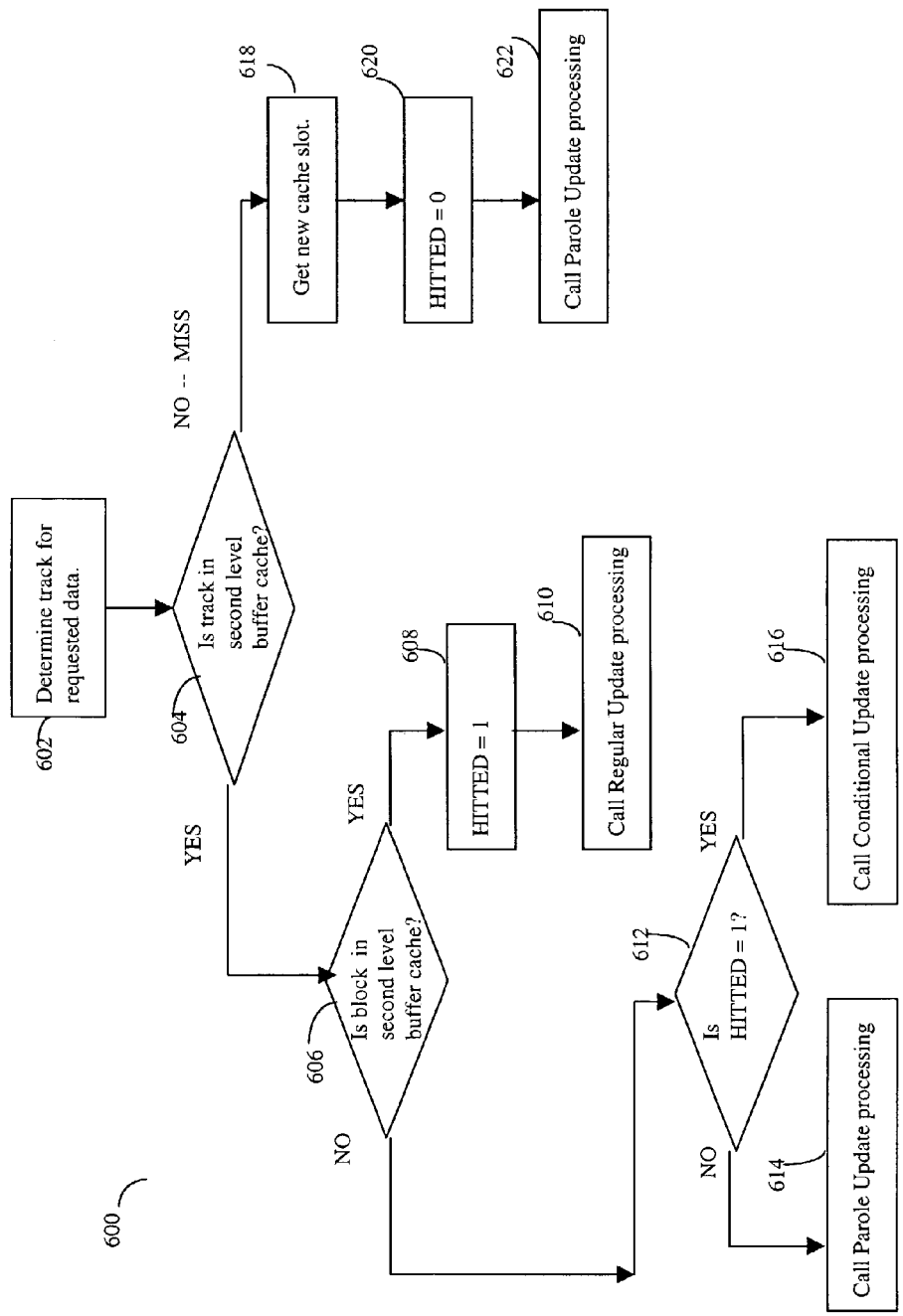
FIGS. 16 and 17 are flowcharts of more detailed processing steps for processing a data request within an embodiment having first and second level buffer caching in an embodiment using a tag-based caching arrangement for the second level caching.

Referring now to FIG. 16, shown is a flowchart 600 of processing steps that may be performed in an embodiment of a computer system in connection with processing for second level buffer caching as may be included, for example, in a data storage system. The steps described in this flowchart refer to a particular embodiment that includes the tag-based cache (TBC) arrangement also described herein. However, the techniques and principles may be applied to other type of cache arrangements.

At step 602, the particular track or tracks in accordance with the requested data is determined. It should be noted that the processing of flowchart 600 may be performed multiple times in accordance with a single data request for each particular track. At step 604, a determination is made as to whether data associated with a particular track is included within the second level buffer cache.

If at step 604 it is determined that data per the particular track being requested is not within the second level buffer cache, control proceeds to step 618 where a new cache slot is obtained. Obtaining and determining a new cache slot, for example where there are no free slots, may be in accordance with each particular embodiment and the policies implemented within a particular cache included in that embodiment. For example, in connection with a TBC arrangement, when there are no free slots, a particular slot may be located using techniques, for example, described in connection with flowchart 250 of FIG. 10 where the oldest slot is displaced from the queue or cache in accordance with a replacement policy.

Subsequently, control proceeds to step 620 where a variable called HITTED is set to zero. In this particular embodiment, HITTED may be represented as a binary or boolean variable having two states, such as zero and one. A state of HITTED=1 may indicate that some block within the particular track has been hit more than one time. In this particular embodiment, a track may include a plurality of blocks. Any number of tracks within that block may be in the cache. If any particular block is requested within that track more than one time and there has been a cache hit while this particular block is in the cache, HITTED has a value of one. HITTED has a value of zero otherwise.

Each cache slot in a TBC may include an invalid block vector. In one embodiment, this may be a bit vector having an entry for each block in the associated track of the cache slot. A value of 1 in the bit vector entry may indicate that the block corresponding to the bit vector entry is in the cache. Otherwise, the bit vector entry may be zero. In one embodiment, the invalid block vector may be included at a particular location within each cache slot. Other embodiments may store this information using other data structures and in other locations.

Also included in an embodiment using the TBC may be a flag called HITTED. This flag may be stored with other information about a particular slot. In one embodiment, there may be one HITTED flag for each cache slot. The one or more HITTED flags for each cache slot may be included in the control slot, such as 104*a* described elsewhere herein. In one embodiment, the HITTED flag may be a bit used from the timestamp portion of the tag 112*a* of FIG. 8. This may provide an advantage of obtaining the HITTED flag without accessing another portion of the cache or other location. An embodiment may also include the HITTED flag in a portion of each cache slot or other location that may vary with each embodiment.

After the variable HITTED is initialized or set to zero in accordance with the new cache slot allocated for the current track, control proceeds to step 622 where parole update processing is performed. In one embodiment, parole update processing may move the current cache slot to the midway or halfway point of the cache. Using timestamps, the timestamp of the new slot may be initialized as: current timestamp—½ FTT. Other embodiments may select to position the new slot at other points within the cache.

At step 604, if a determination is made that the track is within the second level buffer cache, control proceeds to step 606 where a further determination is made as to whether a particular block of the track being requested is within the second level buffer cache. An embodiment may use the invalid block vector, for example, in making this determination. If so, control proceeds to step 608 where HITTED is then set to one to indicate that there is a second hit and the block is currently in cache.

Control proceeds to step 610 where regular update processing is performed. In one embodiment, regular update processing may, for example, move the current cache slot to the top or beginning of the data structure cache queue such that it will now be the last choice for displacement. In other words, regular update processing may be performed in accordance with the particular policy or cache management technique implemented within a particular embodiment. Other types of processing may be performed in accordance with a particular policy of a selected embodiment.

If at step 606 it is determined that the block is not within the second level buffer cache, control proceeds to step 612, where a further determination is made as to whether the variable HITTED associated with the current track's cache slot is =1. If HITTED=1, control proceeds to step 616 where a conditional update processing is performed. More detailed processing steps associated with conditional update processing are described elsewhere herein. Otherwise, at step 612, if HITTED is not =1, control proceeds to step 614 where parole update processing may be performed. The processing at step 614 is similar to the processing performed at step 622 described elsewhere herein.

It should be noted that parole update processing for example, as described in connection with steps 614 and 622, may logically move or reposition a cache slot to a different position within a cache by adjusting the timestamp, for example, in the TBC arrangement described elsewhere herein. Recall, for example, in connection a logical representation of FIG. 4A, that the head of the queue may be characterized as the youngest cache slot. By accordingly selecting a timestamp value in accordance with the amount of time it takes for a cache slot to progress from the head to the tail of the queue, the amount of time a cache slot remains in the queue is affected.

Figure 17:
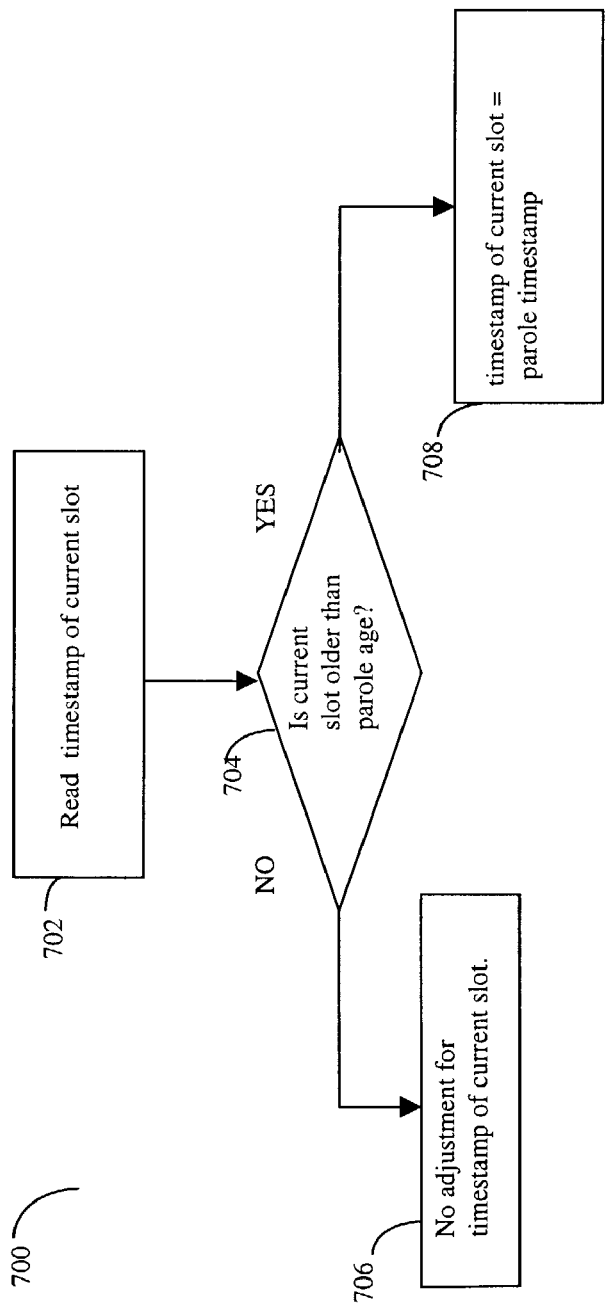

Referring now to FIG. 17, shown are processing steps of a flowchart 700 that may be included in one embodiment for performing the conditional update processing as described in connection with step 616 of FIG. 16. At step 702, the timestamp of the current slot is read. At step 704, a determination is made as to whether the current slot is older than the parole age. The parole age may be indicated by the parole time stamp value. The determination may be made by comparing the timestamp of the current slot to the parole time stamp value. In one embodiment, the parole timestamp may be: the current timestamp—½ FTT. Other embodiments may select a parole timestamp as a threshold value in that may vary accordance with each particular embodiment.

If, at step 704, a determination is made that the timestamp of the current slot is less than the parole timestamp indicating that the current slot is older than the parole time stamp, control proceeds to step 708 where the timestamp of the current slot is updated to be the parole timestamp value, such as current timestamp—½ FTT. Otherwise, at step 704, if the timestamp of the current slot is not less than the parole timestamp, control proceeds from step 704 to step 706 where there is no adjustment made to the timestamp of the current slot.

The foregoing ensures that the current slot is at least at a particular threshold point in the cache in which the threshold hold point is indicated by the parole timestamp. The threshold point relates to how long an element typically remains in the cache.

What will now be described are flowcharts that may be used in connection with an embodiment utilizing a linked list cache structure, for example, forming a circular structure described elsewhere herein. In particular, a second chance flag may be used as described in following paragraphs as an alternative to the HITTED flag described in connection with the TBC above.

Figure 18:
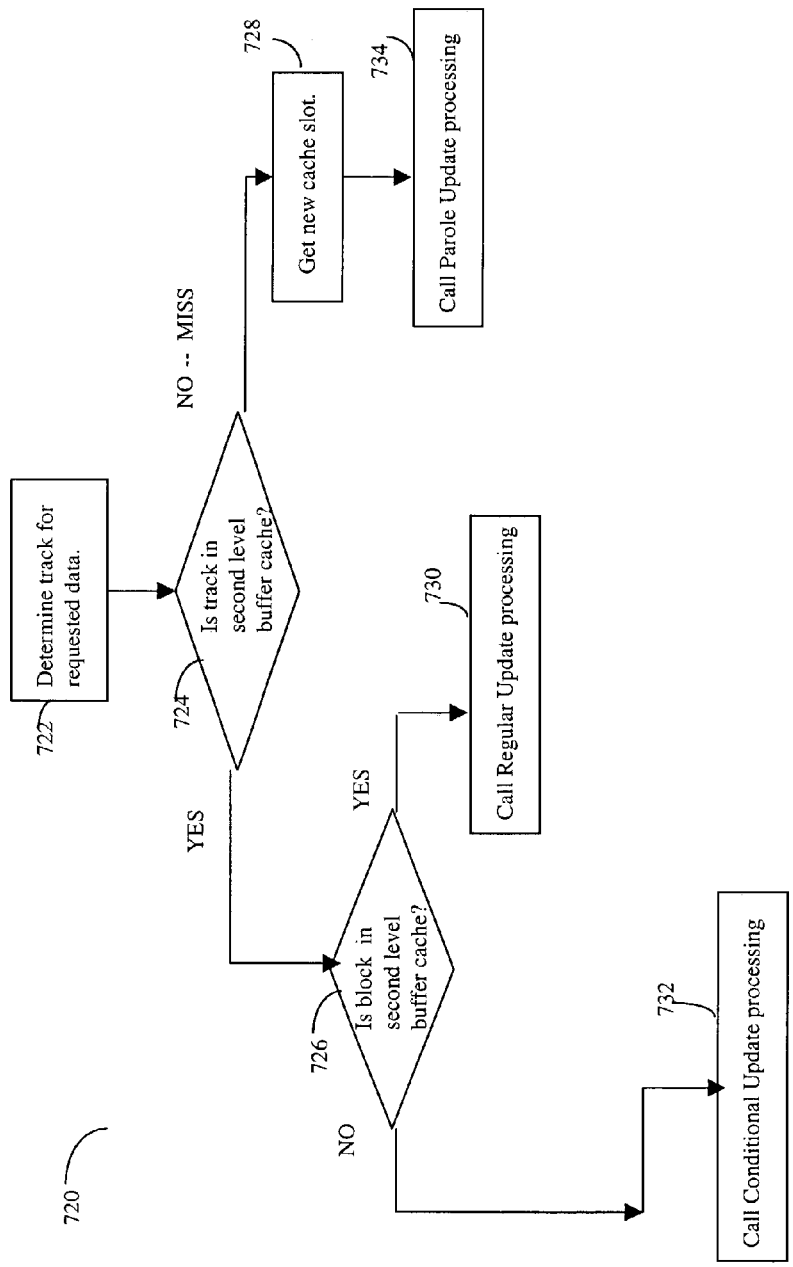
FIGS. 18 and 19 are flowcharts of more detailed processing steps for processing a data request within an embodiment having first and second level buffer caching in an embodiment using a linked list queue data structure for the second level caching.

Referring now to FIG. 18, shown is a flowchart 720 of steps of a method for performing second level buffer caching in an embodiment using a second chance flag with a cache structure implemented as a circular linked list. It should be noted that the processing steps of flowchart 720 may be performed multiple times for a single request in accordance with the number of tracks associated with the request. The steps of flowchart 720 may be used as alternative to processing steps described in connection with flowchart 600. At step 722, the track for the requested data is determined. At step 724, a determination is made as to whether the track requested is in the second level buffer cache. If it is determined that the requested track is not within the second level buffer cache, control proceeds to step 728 to obtain a new cache slot.

As part of the get new cache slot processing of step 728 in this embodiment, the second chance flag may be used in determining which slot to displace in the event there are no currently free slots. As described elsewhere herein, the get new cache slot processing may obtain the first free slot, or displace the oldest slot having the second chance flag=0. The newly allocated cache slot may then have its second chance flag initialized to 0. A cache may implemented as a queue using the ring-like structure with a linked list, for example as described previously in connection with the data structure 60 of FIG. 3, using cache management techniques described in U.S. Pat. No. 5,381,539, which is incorporated by reference herein.

Control proceeds to step 734 where parole update processing may be performed. In this example, the parole update processing may place the current slot at the top of the queue cache structure (the head of the list) by, for example, manipulating pointers to place the slot at this particular position with the linked list queue structure.

If, at step 724, it is determined that the track is currently in the cache, control proceeds to step 726 where a determination is made as to whether the block being of the track requested is located in the cache. This determination may be performed using an invalid block bit vector, for example, described elsewhere herein in connection with the TBC embodiment. At step 726, if a determination is made that the block being requested is currently in the cache, control proceeds to step 730 where regular update processing may be performed. As described elsewhere herein, regular update processing may be updating of the cache in accordance with a currently implemented cache policy. For example, in one embodiment, as part of normal update processing, the current cache slot may be moved to the head or top of the queue making it the youngest queue element. Additionally, the second chance flag may be set to 1. Other embodiments may move the current cache slot to other positions within the cache in accordance with other policies. If, at step 726, it is determined that the current block is not in the cache, control proceeds to step 732 where conditional update processing is performed.

Figure 19:
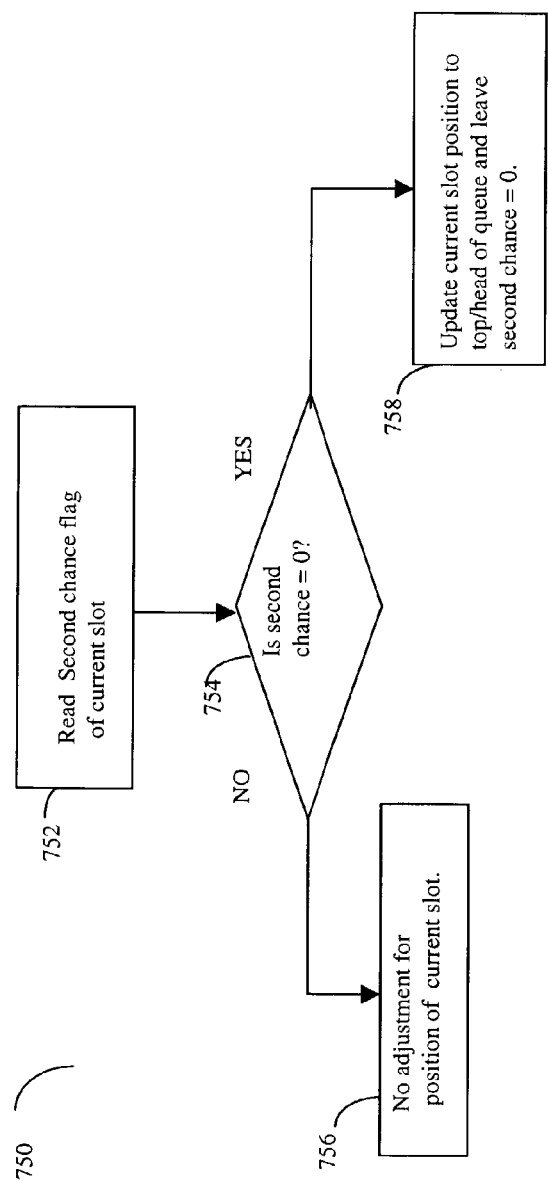

Referring now to FIG. 19, shown are processing steps that may be performed in connection with conditional update processing in an embodiment that includes use of a second chance flag rather than a bit value flag HITTED. In other words, the processing steps of flowchart 750 of FIG. 19 may be used in an embodiment as an alternative to the processing steps of flowchart 700 of FIG. 17 in connection with performing conditional update processing in an embodiment that includes, for example, the linked list structure 60 of FIG. 3.

In the linked list arrangement also described herein, each particular cache slot may have associated with it a second chance flag having a value of zero or one. The second chance flag may be set initially to zero when a slot is allocated and initialized. Subsequently, the second chance flag may be set to one as part of normal update processing when a cache hit occurs to the particular slot. In connection with determining a free slot and deciding which cache slot to displace, as in step 618 processing, a slot having a second chance flag=1 may be passed over and not displaced. Rather, when searching for a slot to displace, if a cache slot has the second chance=1, the second chance flag of the current slot is set to 0 and the search continues for a slot which has second chance flag=0. An embodiment may have a second chance flag associated with each cache slot. In one embodiment, the second chance flag may be included as a flag bit located within each cache slot. The second chance flag may be included in other locations that vary in accordance with each embodiment.

At step 752, the second chance flag of the current cache slot is read. At step 754, a determination is made as to whether the second chance flag is zero. If so, control proceeds to step 758 where the current slot position is updated to the head of the queue, such as by pointer modification. An embodiment may also select to move the current cache slot to another position within the cache, such as to the middle of the queue cache structure. At step 754, if it is determined that the second chance flag is not equal to zero, control proceeds to step 756 where there is no adjustment made for the position of the current slot within the cache.

What has just been described is a processing step that may be performed in connection with second level buffer caching techniques. In particular, the position of the cache slot may be updated in accordance with whether a cache slot is hit once, or more than once.

It should be noted that in connection with techniques described herein, the cache structure may be managed using a locking technique which locks the entire cache data structure, or a portion thereof, when multiple processes may be simultaneously performing reading and writing operations of the shared resource, the cache. A locking mechanism that may be included in an embodiment having such multiple processes may be used to enforce an exclusive access policy of the shared cache resource. For example, the locking mechanism may ensure that only one process may access and manipulate the entire queue or cache data structure at a particular time. When there are multiple processors executing multiple processes that need to access the cache, this global exclusive access policy may become a bottleneck. Alternatively, other locking techniques may be used that may vary with each embodiment. For example, an embodiment may utilize the atomic instruction technique, or equivalent thereof, as described elsewhere herein in connection with the tag-based cache.

Different locking mechanisms may be used in an embodiment depending on the type of cache or queue data structure as well as the functionality included in, for example, the operating system and other hardware and/or software of a particular embodiment. Other embodiments may include other functionality, such as use of semaphores or mutual exclusive or protected sections, for enforcing an exclusive access to a shared resource policy when writing or modifying the shared cache resource.

An embodiment may select different values used herein, such as parole time stamp values. These values may be determined in accordance with tuning a system for its particular performance.

As described herein, conditional update processing may be performed on cache slots which have more than one cache hit. Accordingly, on these slots, if the slot is within a particular bottom portion of the queue indicating that the current cache slot may be displaced within some threshold time period, the cache slot may be promoted or updated to remain in the queue longer. Otherwise, if the slot is not within a threshold portion of the queue (some bottom portion), there is a determination that promotion of the current slot is not performed.

Figure 20:
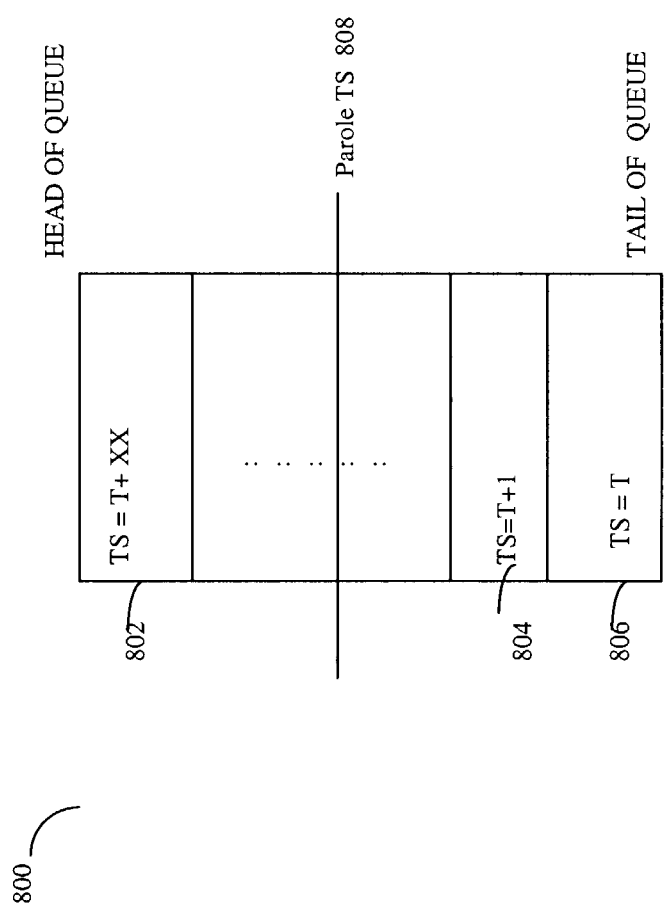
FIG. 20 is an example illustrating the use of a parole timestamp in connection with a cache data structure.

Referring now to FIG. 20, shown is an example 800 of an embodiment of a logical representation of a queue data structure. This may be a logical representation of a cache data structure included in an embodiment. In this example, the TAIL of the queue has a time stamp value (TS) of T. When a new slot is needed and all cache entries are taken, a free slot may be obtained in one embodiment by selecting the element at the TAIL of the logical queue denoting the oldest timestamp, for example. The element at the TAIL of the queue is displaced and a associated with a new portion of data inserted into the queue. The new entry may be inserted into the queue, for example, by placing it at the HEAD of the queue. Other cache slots corresponding to other queue entries moving from the TAIL to the HEAD have increasing TS values indicating that these are younger entries. A parole TS value 808 may be selected corresponding to a particular threshold level of the queue in accordance with the FTT associated with the queue. For example, if it is determined that an element within the queue that has multiple cache hits is within a predetermined portion of the queue or cache, such as the bottom ⅓ or ½ of the queue, this cache slot may be promoted within the cache by moving the cache slot, for example, to the HEAD position in the queue.

The foregoing of FIG. 20 may also represent a cache implemented using a circular linked list data structure as described elsewhere herein in more detail. Cache slots may be positioned at various points within the cache through pointer manipulation rather than timestamp adjustment.

In following paragraphs, different techniques are described in which caching behavior characteristics associated with each device may be determined using parameter values. The parameter values may be used in determining, for example, cache usage and positions of cache slots associated with different devices for any one or more processing operations described herein. These parameters may be referred to herein as QOS parameters providing controls related to the QOS for devices included in the data storage system.

Referring now to FIG. 21, shown is an example of a device configuration table 850 that includes device configuration information in column 854b corresponding to a device specified in the first column, 854a. A particular row of the table 850, such as 852, includes device configuration information associated with a particular device such as D1. QOS parameter information 856 may be included as a portion of the device configuration information 854b. QOS parameter information 856 may include one or more parameter values specifying device specific information. In one embodiment, QOS parameter information 856 includes parameter information related to device caching characteristics and controls. The particular QOS parameters that may be included in are described elsewhere herein in more detail.

The device configuration information included in table 850 may be stored in a portion of global memory that includes device configuration data. The device configuration information 854b including values for QOS parameters 856 may be specified as part of a data configuration file. The QOS parameter information may be initially set and/or subsequently modified, for example, using system calls to modify the data configuration file. An embodiment may provide for dynamic and/or manual modification of the data configuration information 854b, such as the QOS parameter information.

An embodiment may store the configuration information in global memory as well as in other locations that may vary in accordance with each embodiment. In other words, a global copy may be stored in global memory and the global copy may be stored and utilized, for example, by each of the directors or processors in an embodiment of the data storage system as described, for example, in connection with FIG. 2.

It should be noted that an embodiment may have a device record corresponding to each particular device within the system. The device record may include both dynamic and static device specific information, such as device characteristics in addition to the QOS parameter information. A value for a QOS parameter may be specified in a configuration file. The configuration file may be read at one or more times in an embodiment, for example, in connection with a device being powered-on or brought on-line, and the like. The configuration file data may be used to initialize portions of device records, for example, in connection with a device or the data storage system being brought on line. The particular location(s) of the configuration file may vary in accordance with each embodiment.

Figure 22:
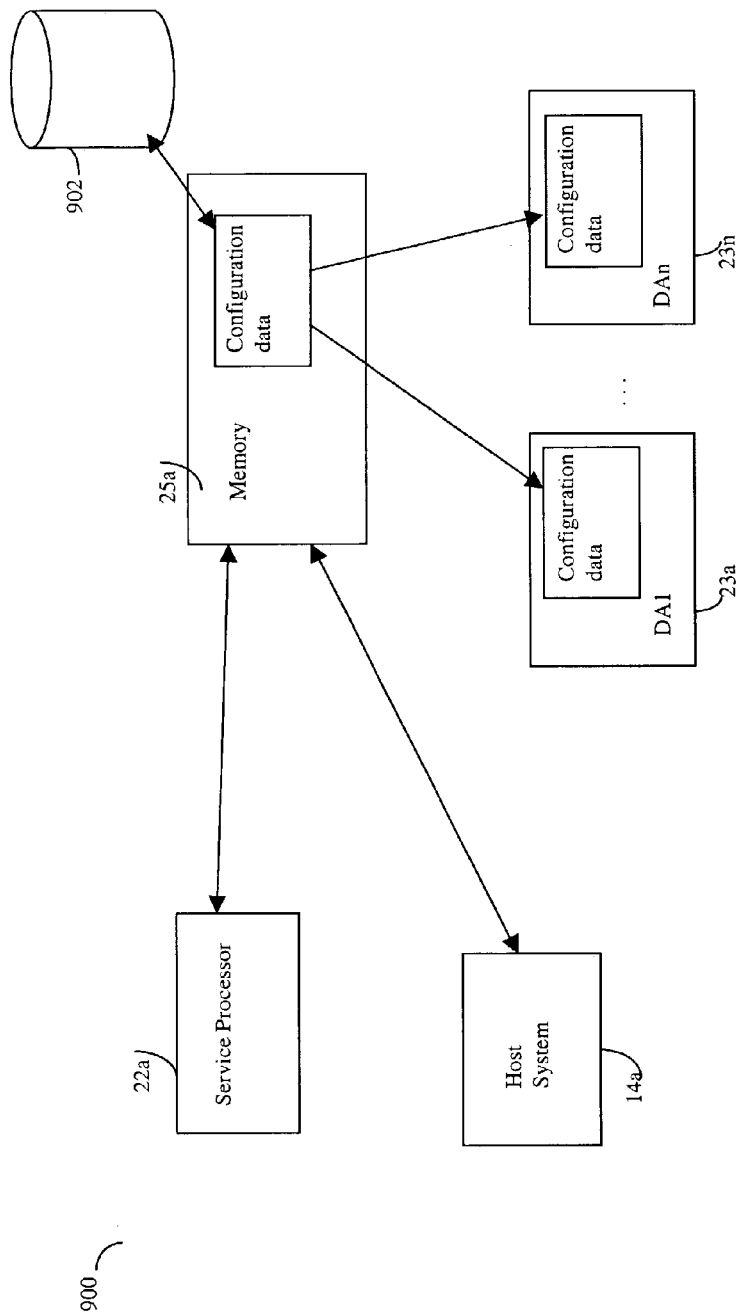
FIG. 22 is an illustration of data flow for configuration data between components included in an embodiment of the system of FIG. 1.

Referring now to FIG. 22, shown is an example of an embodiment 900 components of a system illustrating data flow in connection with configuration data. It should be noted that the example 900 may be characterized as a simplistic view of an embodiment of a system 10, for example, as described previously in connection with FIG. 1. The example 900 includes only particular components for the purpose of illustrating data flow and access in connection with configuration data, or portions thereof, as may be included in one embodiment. An actual system 10 may include other components than as described in connection with FIG. 22.

A copy of the configuration data including, for example, QOS parameters may be included in a portion of system memory 25a. As previously described in connection with FIG. 2, each of the Symmetrix™ data storage systems or other data storage systems may include a portion of memory which is accessible and used by other components within the data storage system. A copy of the configuration data is stored in the memory portion 25a. At power up time, for example, the configuration data may be loaded into the memory portion 25a from a storage medium, such as a non-volatile storage medium 902. Subsequently, copies of the configuration data, or portions thereof, may be propagated to each of the DAs, such as 23a to 23n.

Configuration data, such as the QOS parameters, may be modified and accessed by the service processor 22a in one embodiment. If one of the QOS parameters is modified through an administrator or other user accessing the configuration data in memory 25a through the service processor 22a, the updated configuration data may subsequently be sent to each of the DAs 23a to 23m. Similarly, an application programming interface (API) may be provided such that configuration data, such as QOS parameter information, may be accessed and/or modified by a host system such as 14a. A program on a host system, for example such as 14a, may utilize the API to set certain QOS parameters causing an update to the configuration data stored in the memory 25a. The API may reside on the host system and/or within the data storage system. Subsequent to updating the configuration data in memory 25a, the updated configuration data may be sent to each of the DAs 23a through 23n which store their own local copy of configuration data. Additionally, the copy of the configuration data stored in the non-volatile memory 902 may also be updated in accordance with any changes or modifications made using the service processor or using an API with a host system.

It should be noted that in example 900, the directors, such as the DAs, may use different versions of portions of the configuration data. In particular with respect to the QOS parameters, the DAs may use different versions of the QOS parameters. In this embodiment, it is not necessary that the local copies of the QOS parameters used by each of the DAs be synchronized. However, it should be noted that in an embodiment, there may be other data included in the configuration data requiring that local copies, such as used by the DAs, be synchronized with each other and with the copy on global memory. However, with respect to the QOS parameters as described herein, such synchronization of versions is not required.

Figure 23:
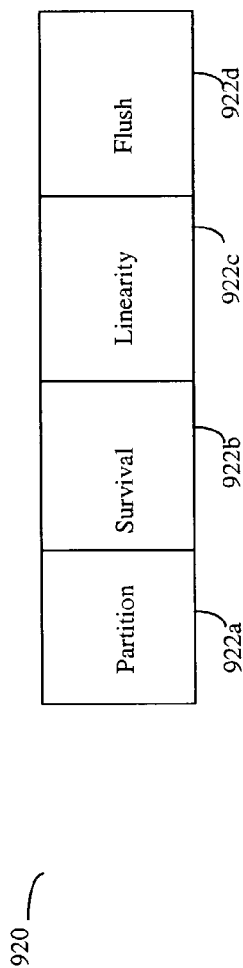
FIG. 23 is an example of an embodiment of a data structure used in connection with QOS parameter values for characterizing cache behavior associated with a device.

Referring now to FIG. 23, shown is an example of an embodiment 920 of a data structure used in connection with QOS parameters. As described herein in connection with the data structure 920, the QOS parameters may be used in connection with characterizing the behavior of a device with respect to caching of the data storage device. An embodiment may include additional QOS parameters besides those described herein in connection with caching characteristics. Additionally, an embodiment may also include other QOS parameters besides those related to caching for a particular device.

In this particular example, 4 QOS parameters may be represented with 16 bits of information in which each parameter is represented by 4 bits. Other embodiments may implement the techniques described herein using a different number of bits to represent each of the parameter values. The particular values and sizes described herein are provided by way of example and should not be construed as a limitation. Additionally, a different organization may be used in connection with representing each of the parameters for a particular device.

Included in this example is the first QOS parameter 922a referenced herein as the Partition parameter. The Partition parameter 922a may be used to designate which portions of the cache included in the data storage system may be used by an associated device. The second QOS parameter is the Survival parameter 922b which represents how likely it is that a portion of data will be reused after a hit. The survival parameter may be used in determining how long a particular portion of data associated with the device may be kept in cache after it has been used. The third QOS parameter may be referred to herein as the Linearity parameter 922c. The Linearity parameter 922c may represent how likely it is that sequential tracks of data will be used after a hit. The Linearity parameter may be used in determining whether prefetching of data may be performed in connection with an associated device. The fourth QOS parameter may be referred to herein as the Flush parameter 922d representing how likely it is that the data will be reused after a write. The Flush parameter may be used in determining how long data remains in the cache after a write operation has occurred. In one embodiment, the Flush parameter may affect how long data remains in cache after a data for a designated write pending operation has been destaged and written out to the actual device, such as by the DA.

Each of the foregoing 4 QOS parameters may be characterized as a knob that may be adjusted for a particular associated device within the system. These knobs may be modified in order to tune performance for a particular device or to otherwise indicate a priority or other type of control over a particular device. Each of the foregoing four parameters 922a through 922d will now be described in more detail.

Partition parameter 922a may represent a 4 bit pattern corresponding to one of 16 predefined masks or bit patterns identifying which caches may be used by a particular device. These 16 predefined bit patterns for example may indicate which of a plurality of caches or replacement queues as described herein may be used by a particular device. The predefined bit pattern may be used in an embodiment with the replacement queue 60 for example as described in connection with FIG. 3. As also described herein, an embodiment may also utilize the TBC such as described, for example, in connection with FIG. 6. In connection with an embodiment utilizing the TBC, the predefined bit patterns or masks may indicate which portions of the cache may be used by a particular device. For example, an embodiment may divide all possible cache memory for the TBC into a plurality of portions. A bit mask or pattern may be used to indicate which of the designated portions may be used by a device by indicating a 1 in a bit position corresponding to the particular cache portion available for use.

The Partition parameter 922a may affect cache behavior, for example, in connection with designating what locations are used when it is necessary to obtain a new cache slot. Processing steps of when a new cache slot is obtained in one embodiment are described elsewhere herein.

The Survival parameter 922b may affect the amount of time a particular portion of a device remains in the cache after it is used or referenced. The Survival parameter may be used to affect the behavior of the cache with respect to how long a particular block remains in cache, for example, after a cache hit occurs. In selecting particular values for the Survival parameter 922b associated with a particular device, one consideration is how likely is it that a particular portion of a device stored in the cache will be reused. In connection with the TBC embodiment described herein, the Survival parameter may affect the value of the new time stamp determined after a cache hit has been determined. An embodiment may also use the Survival parameter in determining a new time stamp value when there has also been a cache miss. This is described elsewhere herein, for example, in connection with processing for getting a new cache slot.

Referring now to FIG. 24, shown is a table 950 summarizing how particular QOS parameter values for the Survival parameter may be used in determining how long data remains in the cache after a cache hit or reference has occurred. It should be noted that in an embodiment using the TBC, the oldest slot may be displaced in the event that a new cache slot is needed and there are no free cache slots. Thus, the timestamp may be used in determining the age of a cache slot. In the queue cache implementation such as in FIG. 3, the slot selected in the event a new cache slot is needed is the slot at the tail of the queue corresponding to the LRU or least recently used position.

Table 950 includes 3 rows of information. Row 952 includes particular QOS Survival parameter values ranging from 0 through hex value F. Row 954 indicates the timestamp value thereby affecting the location associated with a particular cache slot in the TBC implementation described herein. Similarly, row 956 indicates the position of a cache slot within the queue implementation when determining a new time stamp associated with a particular cache slot.

It should be noted that the values included in Row 952 of Table 950 may be specified or set by a user as associated with a particular device as described herein. Similarly, the predefined bit mask or pattern associated with the Partition QOS parameter may be set or specified. The particular QOS parameter values may be specified, for example, using an API or other technique such as previously described in connection with FIG. 22. For example, machine executable code executing on the host may use an API to set one or more QOS parameter values for DEVICE A. The host system transmits these values to the data storage system, such as using system calls between the host and the data storage system. Machine executable code on the data storage system may be executed by one of the processors of the directors or adapters to update the global memory copy and further transmit these updated values to the DAs and others.

In an embodiment utilizing the TBC, a QOS Survival parameter value of zero associated with a device is used to indicate the minimum Survival time such that the associated cache slot is not reused at all. In connection with the TBC implementation described herein, this result may be obtained by updating the time stamp to be zero or an old time stamp value. The value selected may be used to indicate that the corresponding slot is available, or the oldest slot in the cache such that it is the first slot selected for reuse. The QOS Survival parameter value of F or the maximum value in a TBC implementation causes the time stamp associated with the current cache slot to be updated as the current time stamp value. Recall, as described elsewhere herein, the later the time stamp value associated with the cache slot, the younger the age associated with the cache slot causing that particular cache slot to remain within the cache for a longer period of time. In contrast, the older or earlier the time stamp value, the older the associated data in the cache slot causing the associated cache slot to be selected as an older cache slot for reuse. Accordingly, in connection with an embodiment of the TBC cache, the current time stamp is used to indicate the particular position within the cache. For a specified QOS Survival parameter value in between the minimum and the maximum as indicated in column 958b, the time stamp value associated with the particular cache slot is determined as its current time stamp minus one half of the average fall through time (FTT) as described herein.

Row 956 sets forth the particular position within the replacement queue or cache when the queue data structure, for example as described in connection with FIG. 3, is utilized. If the minimum QOS Survival parameter value of zero is specified, the current cache slot is positioned at the least recently used (LRU) position. Recall, as described elsewhere herein, that the LRU position is associated with the bottom or tail of the queue, such as position 78 FIG. 4. Accordingly, this is the first cache slot that may be selected in connection with displacing a cache slot where none are available. When the maximum QOS Survival parameter value is specified in an implementation utilizing the queue cache structure as described herein, the cache slot may be positioned at the most recently used (MRU) slot position and the second chance flag may be set to one (1)/ON. As described elsewhere herein in connection with selecting a new cache slot such as Step 728 of FIG. 18, get new cache slot processing may obtain the first free slot, or alternatively, displace the oldest slot having a second chance flag equal to zero(0)/Off. In this embodiment as described herein, setting the position of the cache slot to the MRU position and also setting the second chance flag=1 causes the associated cache slot to remain in cache 2 complete cycles before being selected for displacement. In the queue implementation of the cache, for other values besides the minimum and the maximum, the cache slot is positioned at the MRU position and the second chance flag is set to zero/off.

The foregoing is only one embodiment or technique of determining a particular position in a cache slot in accordance with a selected QOS Survival parameter value. For example, an embodiment may choose not to include a tiered approach as described in connection with FIG. 24 Table 950 for the TBC implementation. An embodiment may also utilize the equation P1 set forth below:

$$i=0 \ldots Fx, \; CTS-(((FTT*i)+8)/16) \qquad \text{EQUATION P1}$$

where i is the QOS Survival parameter value;

CTS is the current time stamp; and

FTT is the fall through time.

Using the foregoing equation, the time stamp associated with particular cache slot may be determined for any value of the parameter from the minimum to the maximum.

Low Survival QOS parameter values may generally be characterized as being associated with a low likelihood that a particular portion of data associated device may be reused. For example, data that is being backed up is not likely to be reused within a short time period. Accordingly, a device which is being backed up may be assigned or associated with a low Survival QOS parameter value.

Figure 25A:
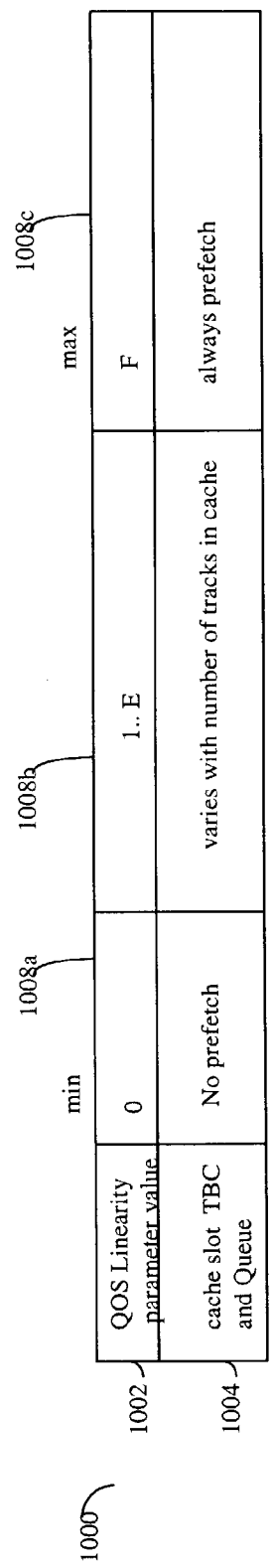
FIG. 25A is a table illustrating the cache behavior in accordance with QOS Linearity parameter values in one embodiment.

Referring now to FIG. 25A, shown is a Table 1000 summarizing the various cache behavior in an embodiment in accordance with QOS Linearity parameter values. Row 1002 indicates the particular QOS Linearity parameter value. Row 1004 of the Table 1000 indicates the particular behavior in connection with Linearity or prefetching behavior. As known to those skilled in the art, any one of the variety of different of prefetching algorithms may be used in connection with the data storage system embodiment. Prefetching may generally be characterized as a policy associated with whether subsequent portions of data are prefetched. For example, if track A of data is referenced in connection with a data operation, a prefetch algorithm may additionally obtain and store in the cache data track A+1. The Linearity QOS parameter value may be used in connection with a prefetch algorithm to determine whether to prefetch data associated with a particular device.

As indicated in Table 1000, when a minimum QOS Linearity parameter value of zero is associated with a particular device, no prefetching is performed in connection with both the TBC and the queue implementation as described herein. It should be noted that in connection with prefetching, there is no distinction in this embodiment in terms of processing performed in connection with TBC and queue cache data structures. When a maximum value for the QOS Linearity parameter value is specified as indicated in Column 108c of Table 1000, prefetching is always performed. For those values in between the minimum and maximum QOS Linearity parameter values as indicated in Column 1008b, whether prefetching is performed may vary in accordance with the number of tracks having a prefetched status already included in the cache. An embodiment may use a predetermined value or proportion of the number of cache slots as a threshold, for example, such as one half, indicating an amount or proportion of prefetched data or cache slots. Whether prefetching is performed depends on the number of existing cache slots having a prefetch status. An embodiment may indicate a slot as having a prefetch status by associating a prefetch flag with each particular cache slot. The prefetch flag indicates whether data associated with this cache slot has been prefetched. When a track of data is placed in the cache slot as a result of a prefetching operation, the prefetch flag of the cache slot is set to 1/ON. When there is a hit or reference to the data within that slot, the prefetch flag is cleared/set to 0, and the associated QOS Linearity parameter associated with that particular device of the cache slot may be used to indicate whether the next or subsequent track of data is prefetched.

An embodiment may use the particular parameter value in between the minimum and maximum values as a weighting factor to determine whether to prefetch data. For example, a threshold number of cache slots may be determined in accordance with a weighting factor that varies with the Linearity parameter value. If the actual number of cache slots having the prefetch status flag=1 is less than the threshold, then prefetching may be performed. In one embodiment, the threshold decreases as the Linearity parameter value increases. An embodiment may also use a plurality of predetermined threshold values in which each threshold value is associated with one or more of the Linearity parameter values. The associated threshold value used is determined in accordance with the current value of the Linearity parameter.

Figure 25B:
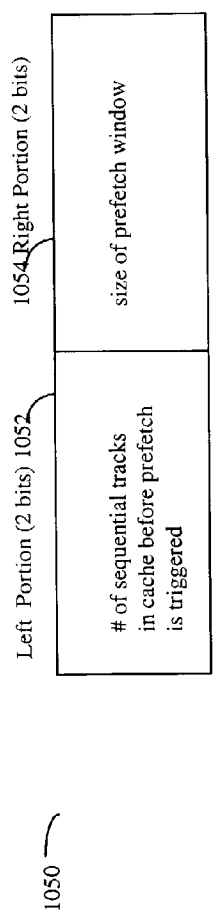
FIG. 25B is an example showing in more detail how a QOS Linearity parameter value is used in determining prefetching characteristics.

An embodiment may also use the Linearity parameter in affecting other aspects and characteristics associated with a prefetching technique. Referring now to FIG. 25B, shown is an example 1050 of one embodiment of how a QOS Linearity parameter value may be used in determining prefetching characteristics. The 4 bits are partitioned into a left portion 1052 and a right portion 1054. The left portion 1052 in this embodiment includes 2 bits representing a combination of 4 different possible bit patterns that may be used in determining whether prefetching is triggered. The right portion 1054 in this embodiment includes 2 bits representing a combination of 4 different possible bit patterns that may be used in determining the amount of data prefetched or the size of the prefetching window.

The left portion 1052 may represent a bit pattern corresponding to a number of prior sequential tracks that must be in cache prior to performing a prefetch. The left portion represents a locality of reference factor considered in accordance with recent past history of references. In this embodiment, a DA makes a determination about whether to prefetch a next track X using a Linearity parameter corresponding to track X−1. Using the left portion of the Linearity parameter, the DA determines whether the preceding number of tracks as indicated by the left portion immediately preceding track X−1 are currently in cache. This may be performed using the cache index or track ID table 80 described elsewhere herein in more detail. The left portion may indicate a higher number of sequential tracks required if a larger degree of locality of reference is desired prior to triggering a prefetch. If the number of sequential tracks as indicated by the left portion are currently in cache, then prefetching is performed. It should be noted that the number of sequential tracks may be indicated by the actual bit pattern of 0 through 3 or may alternatively indicate another set of predetermined values. For example, bit pattern 0 in the left portion may indicate that the number of sequential tracks is "1", bit pattern 1 in the left hand portion may indicate that the number of sequential tracks is "3", and so on. This may vary in accordance with each embodiment.

The right portion 1054 in this embodiment may be used to indicate the amount of data to prefetch. The right hand portion 1054 may indicate a prefetch window size of "m" tracks where "m" is specified by the value of the right hand portion 1054. The DA may implement techniques to ensure that prefetching with increasingly large window sizes does not cause undue displacement of data from the cache. For example, the DA may specify that no more than "n" cache slots may be allocated for use with a prefetch window size of "m" where n<=m. The DA may reuse the "n" cache slots among the "m" cache slots prefetched. For example, if m=3, n=2 and cache slots associated with tracks X+1, X+2 and X+3 are to be prefetched, the DA may determine that cache slot of track X+1 is already in the cache. Rather than get a new cache slot, for example, from a pool of free or available cache slots using techniques described elsewhere herein, the DA may reuse the cache slot associated with track X+1 to store in cache the data of track X+2 and get a new cache slot for track X+3. It should be noted that, as with the left portion indicating a number of sequential tracks, the bit pattern of the right portion may indicate the actual window size. For example, a right portion having a value of 0 may correspond to prefetching the next single track, a right portion having a value of 1 may correspond to prefetching the next 5 tracks and so on for other bit patterns.

As an example of the foregoing, a prefetch process may execute in an embodiment, such as a DA, in which the foregoing left portion is 3 and the foregoing right portion is 5. Tracks 10, 11, and 12 of a devices are placed into cache as a result of a data operation. The prefetch process recognizes that there is a sequence of 3 tracks and begins the prefetching operation of tracks subsequent to track 12. The DA in this example prefetches tracks 13–17 (5 tracks) and each cache slot associated with each of tracks 13–17 has the prefetch flag set to ON/1. A data request is received for tracks 13 and 14 which are already in cache resulting in a cache hit. The flag bits associated with tracks 13 and 14 are set to OFF/0 due to the cache hit. The prefetch process recognizes that tracks 13 and 14 were referenced and replaces data of tracks 13 and 14 currently in the cache with data from tracks 18 and 19. Cache slots associated with tracks 18 and 19 have the prefetch flag set to ON/1 since this data is in the cache as the result of a prefetch operation. Cache slots associated with tracks 13 and 14 are reused in this example to maintain the size of 5 prefetch slots (prefetch flag=ON/1) as indicated by the right portion value of 5. The left portion value of 3 in this example may be characterized as the predetermined value causing data prefetching to be performed.

An embodiment may specify a low Linearity parameter value for devices containing, for example, non-streaming data. In contrast, if a particular device includes data that may be characterized as "streaming", such as with video or audio data stream, the associated Linearity parameter may be set to the maximum value since, for these types of devices, it is likely that the next or subsequent track of data may be used. Accordingly, an embodiment may select to always perform prefetching for a particular device based on the characteristic of the data on the particular device and/or its usage. The Linearity parameter may affect one or more prefetching characteristics, such as whether the prefetch any data, and the amount of data to prefetch if any prefetching is performed.

It should be noted that the foregoing Linearity parameter may be used in an embodiment in connection with any one or more prefetching techniques such as, for example, described in U.S. Pat. No. 5,537,568, Jul. 16, 1996 to Yanai et al., U.S. Pat. No. 6,035,375, Mar. 7, 2000 to Yanai et al., U.S. Pat. No. 5,381,539, Jan. 10, 1995 to Yanai et al., U.S. Pat. No. 6,529,998, Mar. 4, 2003 to Yochai et al. The foregoing Linearity parameter may be used in connection with determining whether or not to invoke any one or more of a variety of different prefetching techniques that may be used in an embodiment.

Figure 26:
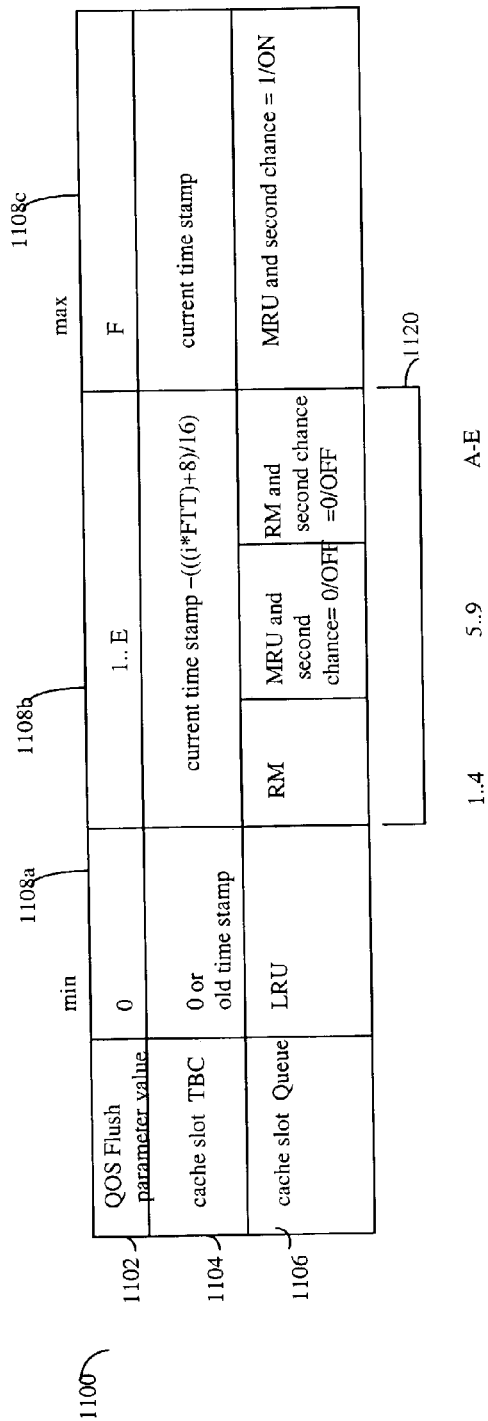
FIG. 26 is a table illustrating the cache behavior in accordance with QOS Flush parameter values in one embodiment.

Referring now to FIG. 26, shown is the table 1100 summarizing the cache behavior associated with the QOS Flush parameter values. As described elsewhere herein, the QOS Flush parameter value may be used to effect cache behavior with respect to data that has been destaged. The Flush value may be used to affect how long data remains in the cache after it has been written out to the device. In one embodiment as described elsewhere herein, a write pending slot is a slot that includes data to be written out to an actual device. The write pending status may be designated through use of the WP flag associated with each cache slot as described elsewhere herein. When the DA actually writes the data out to the device, the WP flag is cleared and the associated cache slot still contains the data that has just been written out to the device by the DA. The Flush parameter affects the position to which the write pending slot is placed within the cache after the data has been written out to the device by the DA. Accordingly, the Flush parameter value may be used to affect how long write pending data that has just been destaged remains within the cache. The particular QOS Flush parameter value may be determined in accordance with how likely such write pending data is to be reused. Higher Flush parameter values may be used or associated with devices including data that are more likely to be reused after the data is written out. It should be noted that an embodiment may also choose to always flush data associated with a device such that data does not remain in the cache for long periods of time, or is the next cache slot used.

In an embodiment that includes the TBC implementation, a QOS Flush parameter value of 0 indicating the minimum parameter value causes write pending cache slot to be returned to the oldest position with the queue by having the cache slot's time stamp set to indicate the oldest time stamp value of those included in the cache. Alternatively, an embodiment may set the time stamp of the cache slot being returned to 0 or some other value indicating that the cache slot is available. In an embodiment using the queue cache implementation, the cache slot returned after a write pending operation is positioned at the LRU position. In other words, the LRU position is the tail of the queue which is the next slot selected or displaced from the cache. In contrast to the minimum QOS Flush parameter value is the maximum QOS Flush parameter value indicated in column 1108*c*. In a TBC implementation, a returned write pending slot has its time stamp set to the current time stamp making it the youngest cache slot within the cache. In the queue cache implementation, a returned write pending slot is positioned at the MRU position and the second chance flag is set to 1/on.

Column 1108*b* indicates return cache positions for the write pending slot for QOS Flush parameter values between the minimum and the maximum values just described. For the TBC implementation, the return write pending slot has a time stamp determined by EQUATION P1. It should be noted that the EQUATION P1 may vary in accordance with the number of bits and the size or range of the QOS Flush parameter value in an embodiment. In this particular embodiment, the 8 and the 16 as used in equation P1 cause rounding of time stamp values that are determined in accordance with the number of bits as described herein.

In a queue implementation of the cache, an embodiment may further divide or categorize the behavior associated with intermediate values 1 through E for the QOS Flush parameter value. In one embodiment, if the QOS Flush parameter value has a value within the inclusive range 1 through 4, a random middle or RM technique may be used in selecting a return position for the write pending slot. It should be noted that particular processing steps one embodiment of the RM or random middle technique are described in more detail in following paragraphs. For QOS Flush parameter values within the inclusive range of 5 through 9, the write pending cache slot is returned in the MRU position and the second chance flag is set to 0/off. For QOS Flush parameter values within the range of A through E in the hex or base 16 notation, the write pending slot is returned to the slot position selected by the RM or random middle technique and the second chance flag is set to 0/off.

It should be noted that other embodiments may use other ranges for the values of the QOS Flush parameter associated with column 1108*b* as described above. In particular, an embodiment may vary the ranges and the particular slot position to which a write pending slot is returned within the cache as indicated by ranges 1120.

Figure 27:
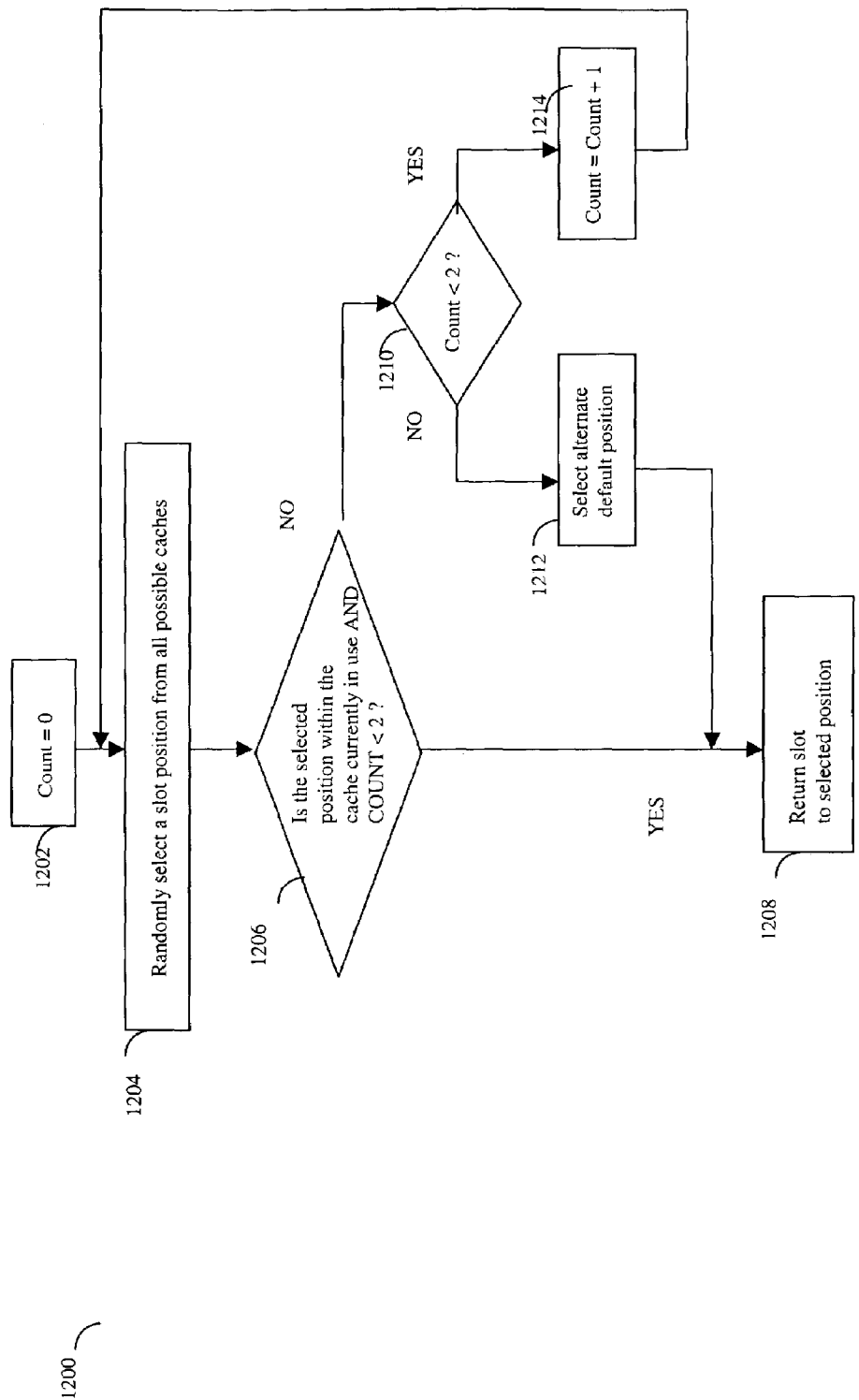
FIG. 27 is a flowchart of steps of one embodiment of the random middle technique used in connection with predetermined QOS Flush parameter values as set forth in the table of FIG. 26.

Referring now to FIG. 27, shown is a flowchart 1200 of steps of one embodiment for implementing the RM or random middle technique. At step 1202, a variable count is initialized to 0. At step 1204, a slot position is selected from all possible caches. This selection may be performed randomly. It should be noted that the position selected at step 1204 is a cache slot position selected from all possible caches. For example, in an embodiment of the queue based cache having 16 queues, a cache position is randomly selected from all possible cache positions of all 16 queues. At step 1206, a determination is made as to whether the selected position is within the cache currently in use and whether the variable count is less than 2. In connection with step 1206 processing, for example, a particular device may only be allowed to use queue number 1 out of a possible 16 queues. If the selected slot position is in, for example, queue 15, the determination at step 1206 is that the selected slot position is not within the cache currently selected for use for the associated device. If it is determined at step 1206 that the selected position is within the cache currently in use and count is less than 2, control proceeds to step 1208 where the slot of the write pending data is returned to the selected position. Otherwise, control proceeds to step 1210 where a determination is made as to whether the variable count is less than 2. If so, the variable count is incremented by 1 at step 1214 and control proceeds to step 1204 where another randomly selected slot position is selected from all possible caches. If at step 1210 it is determined that the variable count is not less than 2, control proceeds to step 1212 where an alternate default cache position is selected. If step 1212 is reached in processing, two attempts to select a random position have failed to meet the condition in step 1206.

Accordingly, after these two attempts, an alternate default position is selected within the cache. In one embodiment, this alternate default position may be, for example, the LRU or the MRU position. An embodiment may also select any other one of a variety of different positions within the cache to be the alternate default position.

As an example, the minimum QOS Flush parameter value may be associated with a device subsequent to performing a save document command for a file included on the device. A save document command may be issued from a word processing application causing a file to be written out to the disk or device. An embodiment may determine that once a document has been saved to disk using a save command issued from a word processing application, the likelihood is not high that the data from that particular document will again be referenced. Accordingly, an implementation may set the QOS Flush parameter value associated with that particular document's device to the minimum value since the likelihood is not high that the data of that file will again be referenced. The foregoing behavior or characteristics may also be true in connection with exiting out of a document from a word processing application.

In connection with Flush parameter values, a data storage system such as the Symmetrix™ data storage system may be used as a second level cache, for example, as described in connection with the example 500 of FIG. 13. Low Flush parameter values may be selected in an embodiment to indicate data on devices which are considered host cached data, such as data written to the disk or other device after a long idle period. As another example, a first host A may write data out to a device in order to share that data with a second host B, such as in connection with an inventory or updated system file. The data that host A writes may be associated with a device having a high Flush parameter value to keep that data in cache because the likelihood is quite high that an additional host, such as host B, may access that inventory information as updated or written by host A.

In one embodiment, use of the QOS parameters may be optionally enabled through use of a switch such that a director may implement caching with or without the QOS parameters. The QOS switch may be implemented as a bit flag, for example, included in the configuration data along with the QOS parameter values. An embodiment may perform operations on the QOS mode switch as with the QOS parameter values such that, for example, the QOS mode switch value may be copied from global memory locally to each DA and also may be modified, for example, as with an API, user interface, or other technique. This dynamic modification of the QOS switch mode allows for dynamically changing caching characteristics when operating a data storage system. When performing data operations, the DA may check the value of the QOS mode switch to determine whether to use the QOS parameter values.

Figure 28:
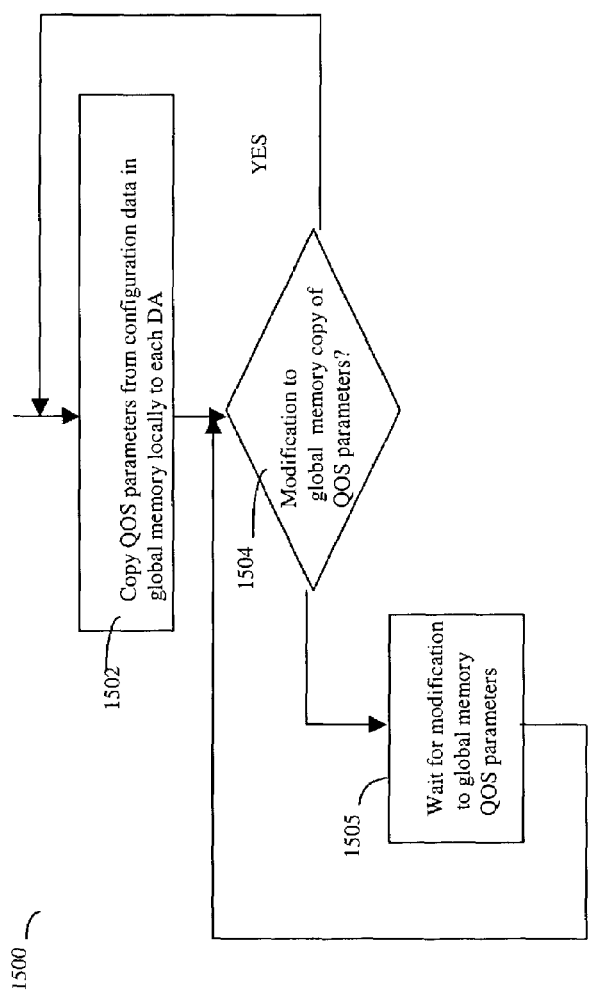
FIG. 28 is a flowchart of steps of one embodiment in connection with maintaining global and local copies of the QOS parameters.

Referring now to FIG. 28, shown is a flowchart 1500 of steps that may be performed in one embodiment in connection with maintaining global and local copies of the QOS parameters. The flowchart 1500 summarizes processing steps described herein. At step 1502, QOS parameter values are copied from the global memory locally to each DA. This may be performed, for example, at a first point in time such as at startup or initialization of the data storage system. At step 1504, a determination is made as to whether the global memory copy has been modified. This may occur, for example, if a system administrator or other modified the QOS parameters associated with a device such as in connection with tuning a system or device. If so, control proceeds to step 1502 where the new QOS values are propagated to each local DA for use. This may be performed by sending a message to each DA to copy the revised QOS parameters from global memory and does not have to be performed in a synchronized fashion as described elsewhere herein. This may be done, for example, by broadcasting a message to each DA sent by the modifying process, such as may be included in the service processor. Otherwise, if there are no modifications, each DA waits until the next QOS modification message to be received at step 1505. The processing at steps 1502, 1504 and 1505 may be performed on a continual basis as the data storage system executes.

Figure 29:
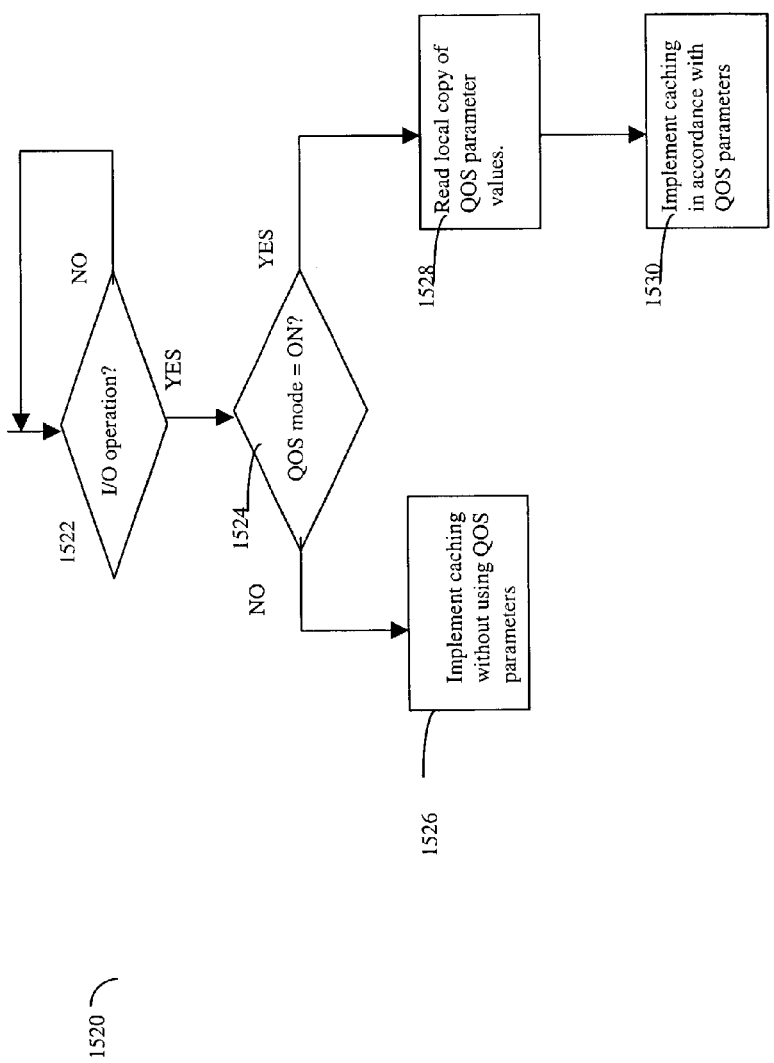
FIG. 29 is a flowchart of steps of one embodiment that may be performed by each director in implementing QOS parameters used with caching.

Referring now to FIG. 29, shown is a flowchart 1520 including steps of one embodiment that may be performed by a DA. At step 1522, there is a determination as to whether there is an I/O operation. If not, the DA waits until an I/O operation occurs and proceeds to step 1524 where a determination is made as to whether the QOS mode switch indicates that QOS parameter processing is ON. If so, control proceeds to step 1528 where the QOS parameter values are read and used in step 1530 to implement caching. Otherwise, control proceeds to step 1526 where I/O processing and caching are implemented without taking into consideration the QOS parameter values. It should be noted that the QOS mode switch may be turned ON and OFF on a per device basis in an embodiment. An embodiment may also choose to have a single QOS mode switch associated with the data storage system and all devices included therein. An embodiment may also utilize both types of the foregoing QOS switches such that if the system wide QOS mode switch=ON, each QOS mode switch per device may turn OFF QOS parameter usage of the device. If the system QOS mode switch=OFF, then it is also OFF for all devices independent of the individual QOS mode switch values per device. Each QOS mode switch per device may be stored along with other device specific QOS parameter data and the global or system-wide QOS parameter value may be stored in another portion of global memory indicated as cacheable.

In one embodiment of the foregoing, the QOS parameter values are associated with each device. The QOS parameter values may be dynamically modified during operation of the data storage system and during operation, these updated values may be transmitted to each of the DAs and others within the data storage system. The QOS parameter values may be set by a user, system administrator, and the like manually, such as using data entry with an input device and user interface. An embodiment may also determine and set QOS parameter values using machine executable code, using a data file, or other manual and/or automated technique. The effect of each parameter value in connection with the caching behavior is determined by techniques that may be implemented in an embodiment of the data storage system. For example, a user may select the various QOS parameter values from the inclusive range of 0 . . . F in hexadecimal. The actual position as to where a cache slot is returned, or the particular technique used in determining such positions may be determined by machine executable code executing on the data storage system.

It should be noted that in the foregoing, one or more of the QOS parameters may be set in accordance with caching characteristics associated with a cache that is one of a primary, secondary or other n-level caching device.

In the foregoing, one or more QOS parameters and corresponding values may be associated with a device. An embodiment may associate QOS parameters with another degree of device granularity than on a per device basis. The one or more QOS parameter values may be associated with each one or more logical volumes, a physical device, a portion of a physical device, portions of multiple physical devices, a physical device track, a logical device, a portion of a logical device, portions of multiple logical devices, and other portions and groupings as known to those of ordinary skill in the art.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for determining cache behavior associated with a logical volume comprising:
 associating at least one parameter affecting a caching characteristic associated with said logical volume, wherein a group of one or more parameters affecting a cache characteristic is configurable on a per logical volume level of granularity; and
 selecting a value for said at least one parameter, wherein said at least one parameter includes at least one of: a partition parameter, a survival parameter, a linearity parameter, and a flush parameter, said partition parameter designating which portions of cache may be used by said logical volume, said survival parameter affecting a time period that a portion of data associated with said logical volume remains in cache, said linearity parameter affecting whether data prefetching is performed for said logical volume, and said flush parameter affecting a time period a portion of data associated with said logical volume remains in cache after destaging a write of said data to said logical volume.

2. The method of claim 1, wherein said value is determined in accordance with at least one of: a predetermined logical volume priority, a characteristic of data stored on the logical volume, and a usage characteristic of the data stored on the logical volume.

3. The method of claim 1, further comprising:
 dynamically modifying said value.

4. The method of claim 3, wherein said value is determined in accordance with tuning performance of said logical volume in a data storage system.

5. The method of claim 1, further comprising:
 examining a mode setting to determine whether to use said value in connection with performing caching and a data operation associated with said logical volume.

6. The method of claim 1, wherein said logical volume is defined as one of: a physical device, a portion of a physical device, portions of multiple physical devices, a physical device track, a logical device, a portion of a logical device, and portions of multiple logical devices.

7. A method for determining cache behavior associated with a logical volume comprising:
 associating at least one parameter affecting a caching characteristic associated with said logical volume;
 selecting a value for said at least one parameter, wherein said at least one parameter includes one of: a partition parameter, a survival parameter, a linearity parameter, and a flush parameter, said partition parameter designating which portions of cache may be used by said logical volume, said survival parameter affecting a time period that a portion of data associated with said logical volume remains in cache, said linearity parameter affecting whether data prefetching is performed for said logical volume, and said flush parameter affecting a time period a portion of data associated with said logical volume remains in cache after destaging a write of said data to said logical volume, wherein said value is determined in accordance with at least one of: a predetermined logical volume priority, a characteristic of data stored on the logical volume, and a usage characteristic of the data stored on the logical volume; and
 dynamically modifying said value, wherein said value is determined in accordance with tuning performance of said logical volume in a data storage system; and
 wherein said value is a first value, and the method further comprising:
 obtaining a first value for said at least one parameter from a portion of global memory;
 copying said first value to another portion of memory local to a first processor controlling data operations to said logical volume;
 updating said first value to a second value in said portion of global memory;
 notifying a plurality of processors including said first processor of said updating;
 copying said second value to said other portion of memory local to said first processor; and
 using said second value by said first processor and using said first value by another processor since updating local copies of said value associated with each of said plurality of processors is performed without synchronization.

8. A method for determining cache behavior associated with a logical volume comprising:
 associating at least one parameter affecting a caching characteristic associated with said logical volume; and
 selecting a value for said at least one parameter, wherein said at least one parameter includes one of: a partition parameter, a survival parameter, a linearity parameter and a flush parameter, said partition parameter designating which portions of cache may be used by said logical volume, said survival parameter affecting a time period that a portion of data associated with said logical volume remains in cache, said linearity parameter affecting whether data prefetching is performed for said logical volume, and said flush parameter affecting a time period a portion of data associated with said logical volume remains in cache after destaging a write of said data to said logical volume; and wherein said at least one parameter includes said partition parameter, and said value is one of a predetermined number of bit patterns indicating one of: which portions of a cache may be used by said logical volume, and which caches of a plurality of caches may be used by said logical volume, and the method further comprising:

receiving by said logical volume a request for a data operation; and using said value in determining a new cache slot to place data associated with said data operation.

9. A method for determining cache behavior associated with a logical volume comprising:

associating at least one parameter affecting a caching characteristic associated with said logical volume;

selecting a value for said at least one parameter, wherein said at least one parameter includes one of: a partition parameter, a survival parameter, a linearity parameter, and a flush parameter, said partition parameter designating which portions of cache may be used by said logical volume, said survival parameter affecting a time period that a portion of data associated with said logical volume remains in cache, said linearity parameter affecting whether data prefetching is performed for said logical volume, and said flush parameter affecting a time period a portion of data associated with said logical volume remains in cache after destaging a write of said data to said logical volume; and wherein said at least one parameter includes said survival parameter, and the method comprising:

receiving by said logical volume a request for a data operation;

determining whether data associated with said data operation is in cache; and using said value to determine a new cache position for said data affecting how long said data remains in said cache.

10. The method of claim 9, wherein said cache uses time stamps in connection with determining said new cache position and the method further comprising:

determining a time stamp value associated with said new cache position in accordance with said value.

11. A method for determining cache behavior associated with a logical volume comprising:

associating at least one parameter affecting a caching characteristic associated with said logical volume; and selecting a value for said at least one parameter, wherein said at least one parameter includes one of: a partition parameter, a survival parameter, a linearity parameter, and a flush parameter, said partition parameter designating which portions of cache may be used by said logical volume, said survival parameter affecting a time period that a portion of data associated with said logical volume remains in cache, said linearity parameter affecting whether data prefetching is performed for said logical volume, and said flush parameter affecting a time period a portion of data associated with said logical volume remains in cache after destaging a write of said data to said logical volume; and wherein said at least one parameter includes said linearity parameter, and the method further comprising:

receiving by said logical volume a request for a data operation; and determining, using said value, whether prefetching is to be performed for said data operation.

12. The method of claim 11, further comprising:

determining, using said value, an amount of data to be prefetched if said prefetching is to be performed.

13. A method for determining cache behavior associated with a logical volume comprising:

associating at least one parameter affecting a caching characteristic associated with said logical volume; and selecting a value for said at least one parameter, wherein said at least one parameter includes one of: a partition parameter, a survival parameter, a linearity parameter, and a flush parameter, said partition parameter designating which portions of cache may be used by said logical volume, said survival parameter affecting a time period that a portion of data associated with said logical volume remains in cache, said linearity parameter affecting whether data prefetching is performed for said logical volume, and said flush parameter affecting a time period a portion of data associated with said logical volume remains in cache after destaging a write of said data to said logical volume; and wherein said at least one parameter includes said flush parameter, and the method further comprising:

writing data included in a cache slot out to said logical volume; and using said value to determine a new cache position for said data included in said cache slot wherein said new cache position affects how long said data remains in cache.

14. A method for determining cache behavior associated with a logical volume comprising:

associating at least one parameter with said logical volume;

determining a performance characteristic of said logical volume; and selecting a value for said at least one parameter in accordance with said performance characteristic, wherein said at least one parameter includes at least one of: a partition parameter, a survival parameter, a linearity parameter, and a flush parameter, said partition parameter designating which portions of cache may be used by said logical volume, said survival parameter affecting a time period that a portion of data associated with said logical volume remains in cache, said linearity parameter affecting whether data prefetching is performed for said logical volume, and said flush parameter affecting a time period a portion of data associated with said logical volume remains in cache after destaging a write of said data to said logical volume, wherein said survival parameter is used in connection with determining a cache slot position for a cache slot upon the occurrence of one or more of a cache hit and a cache miss for said cache slot.

15. A method for determining cache behavior associated with a logical volume comprising:

associating at least one parameter with said logical volume;

determining a performance characteristic of said logical volume; and selecting a value for said at least one parameter in accordance with said performance characteristic, wherein said at least one parameter includes at least one of: a partition parameter, a survival parameter, a linearity parameter, and a flush parameter, said partition parameter designating which portions of cache may be used by said logical volume, said survival parameter affecting a time period that a portion of data associated with said logical volume remains in cache, said linearity parameter affecting whether data prefetching is performed for said logical volume, and said flush parameter affecting a time period a portion of data associated with said logical volume remains in cache after destaging a write of said data to said logical volume; and wherein said logical volume is one of a plurality of logical volumes included in a data storage system, and the performance characteristic is a priority level associated with said logical volume in accordance with others of said plurality of logical volumes.

16. The method of claim 15, further comprising:
dynamically modifying said value included in a portion of global memory; and
copying said value to a local copy of parameter values for use by a processor used in connection with data operations to said logical volume.

17. The method of claim 16, wherein said processor uses a dynamically modifiable switch value to determine whether to use said value when performing a data operation and associated data caching.

18. The method of claim 16, further comprising:
modifying said value using one of: an user interface and an application programming interface.

19. A method for determining cache behavior associated with a logical volume comprising:
associating at least one parameter affecting a caching characteristic associated with said logical volume;
selecting a value for said at least one parameter, wherein said at least one parameter includes one of: a partition parameter, a survival parameter, a linearity parameter, and a flush parameter, said partition parameter designating which portions of cache may be used by said logical volume, said survival parameter affecting a time period that a portion of data associated with said logical volume remains in cache, said linearity parameter affecting whether data prefetching is performed for said logical volume, and said flush parameter affecting a time period a portion of data associated with said logical volume remains in cache after destaging a write of said data to said logical volume; and
using said value to determine cache portions to be used in connection with obtaining cache slots for storing data of said logical volume in cache.

20. The method of claim 19, further comprising:
using said value to determine a cache position of data associated with said logical device after a cache hit for said data has occurred, wherein said cache position affects how long said data remains in cache.

21. The method of claim 20, further comprising:
using said value to determine whether prefetching is performed in connection with a data operation associated with said logical volume.

22. The method of claim 21, further comprising:
using said value to determine an amount of data to prefetch for said data operation.

23. The method of claim 21, further comprising:
writing data out to said logical volume; and
using said value to determine a cache position to where said data is returned, said cache position affecting how long said data remains in cache.

24. A computer readable medium comprising machine executable code stored thereon for determining cache behavior associated with a logical volume, the computer readable medium comprising:
machine executable code that associates at least one parameter affecting a caching characteristic associated with said logical volume wherein a group of one or more parameters affecting a cache characteristic is configurable on a per logical volume level of granularity; and
machine executable code that selects a value for said at least one parameter, wherein said at least one parameter includes at least one of: a partition parameter, a survival parameter, a linearity parameter, and a flush parameter, said partition parameter designating which portions of cache may be used by said logical volume, said survival parameter affecting a time period that a portion of data associated with said logical volume remains in cache, said linearity parameter affecting whether data prefetching is performed for said logical volume, and said flush parameter affecting a time period a portion of data associated with said logical volume remains in cache after destaging a write of said data to said logical volume.

25. The computer readable medium of claim 24, wherein said value is determined in accordance with at least one of: a predetermined logical volume priority, a characteristic of data stored on the logical volume, and a usage characteristic of the data stored on the logical volume.

26. The computer readable medium of claim 24, further comprising:
machine executable code that dynamically modifies said value.

27. The computer readable medium of claim 26, wherein said value is determined in accordance with tuning performance of said logical volume in a data storage system.

28. The computer readable medium of claim 27, wherein said value is a first value, and the computer readable medium further comprising:
machine executable code that obtains a first value for said at least one parameter from a portion of global memory;
machine executable code that copies said first value to another portion of memory local to a first processor controlling data operations to said logical volume;
machine executable code that updates said first value to a second value in said portion of global memory;
machine executable code that notifies a plurality of processors including said first processor of said updating;
machine executable code that copies said second value to said other portion of memory local to said first processor; and
machine executable code that causes said second value to be used by said first processor and said first value to be used by another processor since updating local copies of said value associated with each of said plurality of processors is performed without synchronization.

29. The computer readable medium of claim 24, further comprising:
machine executable code that examines a mode setting to determine whether to use said value in connection with performing caching and a data operation associated with said logical volume.

30. The computer readable medium of claim 24, wherein said at least one parameter includes said partition parameter, and said value is one of a predetermined number of bit patterns indicating one of: which portions of a cache may be used by said logical volume, and which caches of a plurality of caches may be used by said logical volume, and the computer readable medium further comprising:
machine executable code that receives, by said logical volume, a request for a data operation; and machine executable code that uses said value in determining a new cache slot to place data associated with said data operation.

31. The computer readable medium of claim 24, wherein said at least one parameter includes said survival parameter, and the computer readable medium comprising:
machine executable code that receives by said logical volume a request for a data operation;
machine executable code that determines whether data associated with said data operation is in cache; and
machine executable code that uses said value to determine a new cache position for said data affecting how long said data remains in said cache.

32. The computer readable medium of claim 31, wherein said cache uses time stamps in connection with determining said new cache position and the computer readable medium further comprising:
machine executable code that determines a time stamp value associated with said new cache position in accordance with said value.

33. The computer readable medium of claim 24, wherein said at least one parameter includes said linearity parameter, and the computer readable medium further comprising:
machine executable code that receives by said logical volume a request for a data operation; and
machine executable code that determines, using said value, whether prefetching is to be performed for said data operation.

34. The computer readable medium of claim 33, further comprising:
machine executable code that determines, using said value, an amount of data to be prefetched if said prefetching is to be performed.

35. The computer readable medium of claim 24, wherein said at least one parameter includes said flush parameter, and the computer readable medium further comprising:
machine executable code that writes data included in a cache slot out to said logical volume; and
machine executable code that uses said value to determine a new cache position for said data included in said cache slot wherein said new cache position affects how long said data remains in cache.

36. The computer readable medium of claim 24, wherein said logical volume is defined as one of: a physical device, a portion of a physical device, portions of multiple physical devices, a physical device track, a logical device, a portion of a logical device, and portions of multiple logical devices.

37. The computer readable medium of claim 24, further comprising;
machine executable code that uses said value to determine cache portions to be used in connection with obtaining cache slots for storing data of said logical volume in cache.

38. The computer readable medium of claim 37, further comprising:
machine executable code that uses said value to determine a cache position of data associated with said logical device after a cache hit for said data has occurred, wherein said cache position affects how long said data remains in cache.

39. The computer readable medium of claim 38, further comprising:
machine executable code that uses said value to determine whether prefetching is performed in connection with a data operation associated with said logical volume.

40. The computer readable medium of claim 39, further comprising:
machine executable code that uses said value to determine an amount of data to prefetch for said data operation.

41. The computer readable medium of claim 39, further comprising:
machine executable code that writes data out to said logical volume; and
machine executable code that uses said value to determine a cache position to where said data is returned, said cache position affecting how long said data remains in cache.

42. A computer readable medium comprising machine executable code stored thereon for determining cache behavior associated with a logical volume, the computer readable medium comprising:
machine executable code that associates at least one parameter with said logical volume;
machine executable code that determines a performance characteristic of said logical volume; and
machine executable code that selects a value for said at least one parameter in accordance with said performance characteristic, wherein said at least one parameter includes at least one of: a partition parameter, a survival parameter, a linearity parameter, and a flush parameter, said partition parameter designating which portions of cache may be used by said logical volume, said survival parameter affecting a time period that a portion of data associated with said logical volume remains in cache, said linearity parameter affecting whether data prefetching is performed for said logical volume, and said flush parameter affecting a time period a portion of data associated with said logical volume remains in cache after destaging a write of said data to said logical volume wherein said survival parameter is used in connection with determining a cache slot position for a cache slot upon the occurrence of one or more of a cache hit and a cache miss for said cache slot.

43. The computer readable medium of claim 42, wherein said logical volume is one of a plurality of logical volumes included in a data storage system, and the performance characteristic is a priority level associated with said logical volume in accordance with others of said plurality of logical volumes.

44. The computer readable medium of claim 43, further comprising:
machine executable code that that dynamically modifies said value included in a portion of global memory; and
machine executable code that copies said value to a local copy of parameter values for use by a processor used in connection with data operations to said logical volume.

45. The computer readable medium of claim 44, wherein said processor uses a dynamically modifiable switch value to determine whether to use said value when performing a data operation and associated data caching.

46. The computer readable medium of claim 44, further comprising:
machine executable code that modifies said value using one of: an user interface and an application programming interface.

* * * * *